(12) United States Patent
Nader et al.

(10) Patent No.: US 12,484,916 B2
(45) Date of Patent: Dec. 2, 2025

(54) CALCANEAL PLATE INSERTER TOOL

(71) Applicant: Medline Industries, LP, Northfield, IL (US)

(72) Inventors: Samuel Nader, Arlington Heights, IL (US); Dinesh Koka, Winter Park, FL (US); Wesley Reed, Libertyville, IL (US)

(73) Assignee: Medline Industries, LP, Northfield, IL (US)

( * ) Notice: Subject to any disclaimer, the term of this patent is extended or adjusted under 35 U.S.C. 154(b) by 450 days.

(21) Appl. No.: 17/958,501

(22) Filed: Oct. 3, 2022

(65) Prior Publication Data
US 2024/0108363 A1  Apr. 4, 2024

(51) Int. Cl.
*A61B 17/17* (2006.01)
*A61B 17/16* (2006.01)
*A61B 17/56* (2006.01)
*A61B 17/72* (2006.01)
*A61B 17/80* (2006.01)
*A61B 17/88* (2006.01)
*A61F 2/42* (2006.01)

(52) U.S. Cl.
CPC ...... *A61B 17/1775* (2016.11); *A61B 17/1728* (2013.01); *A61B 17/808* (2013.01); *A61B 17/1615* (2013.01); *A61B 17/1682* (2013.01); *A61B 2017/564* (2013.01); *A61B 17/7291* (2013.01); *A61B 17/8019* (2013.01); *A61B 17/8061* (2013.01); *A61B 17/8841* (2013.01); *A61B 17/8872* (2013.01); *A61F 2/4202* (2013.01); *A61F 2/4225* (2013.01)

(58) Field of Classification Search
CPC ..... A61B 17/80; A61B 17/1775; A61B 17/17; A61B 17/1728; A61B 17/808; A61B 17/1615; A61B 17/8061; A61B 17/1682; A61B 17/7291; A61B 17/8019; A61B 17/84; A61B 17/86; A61B 17/88; A61B 17/8841; A61B 17/8872; A61B 17/58; A61B 17/66; A61B 2017/564; A61F 2/42; A61F 2/4202; A61F 2/4225; A61F 2002/4205; A61F 2002/4207; A61F 2002/4212; A61F 2002/4217
USPC .......................................................... 606/281
See application file for complete search history.

(56) References Cited

U.S. PATENT DOCUMENTS 9,597,131 B2    3/2017  Price
2005/0085824 A1*  4/2005  Castaneda .......... A61B 17/1725
                                                                606/98

(Continued)

OTHER PUBLICATIONS

Arthrex, Arthrex Calcaneal Fracture System brochure, 2020.

(Continued)

*Primary Examiner* — Marcela I. Shirsat
(74) *Attorney, Agent, or Firm* — Fitch, Even, Tabin & Flannery LLP

(57) ABSTRACT

A calcaneal plate inserter tool includes a body portion, a plate retainer assembly coupled to the body portion, a sled coupled to the body portion and movable relative to the body portion, and a lock coupled to the body portion. The lock is operable between a lock position and an unlocked position. The lock impedes movement of the sled relative to the body portion when in the lock position. The sled also includes a guide portion.

26 Claims, 35 Drawing Sheets

(56) References Cited

U.S. PATENT DOCUMENTS

| | | | |
|---|---|---|---|
| 2011/0106086 A1* | 5/2011 | Laird | A61B 17/1728 |
| | | | 606/70 |
| 2013/0289626 A1* | 10/2013 | Murashko, Jr. | A61B 17/88 |
| | | | 606/280 |
| 2016/0045238 A1 | 2/2016 | Bohay | |
| 2016/0346022 A1 | 12/2016 | Price | |
| 2018/0242987 A1* | 8/2018 | Lintula | A61B 17/1717 |
| 2023/0060073 A1* | 2/2023 | Niver | A61B 17/1728 |

OTHER PUBLICATIONS

Arthrex, Calcaneal Fractures Innovative Treatment Solutions brochure, 2019.
CoLink Cfx—In2Bones, Comprehensive Low-Profile Calcaneal Fixation System, https://i2b-usa.com/colink-cfx/, printed Aug. 11, 2022.
Coventus, Calcaneus Plate System Surgical Technique Guide brochure, 2021.
Medline Industries, LP, Unite Food & Ankle, Calcaneal Fracture Plating System brochure, 2022.
NEWCLIP Technics, Calcanheal Foot Trauma Solutions, 2021.
Paragon28, Inc., Gorilla Calc Fracture Plating System Product Information brochure, 2020.
Paragon28, Inc., Gorilla Calc Fracture Plating System, Surgical Technique Guide, 2020.
Zimmer Biomet, A.L.P.S.™ Minimally-Invasive and Mesh Calcaneus Plating System brochure, date unknown.

\* cited by examiner

CALCANEAL PLATE INSERTER TOOL

FIELD

The disclosure relates to medical instruments and, more particularly, to a tool for inserting a calcaneal plate into a patient. Assemblies and methods using the tool are also disclosed.

BACKGROUND

Calcaneal plates are used in connection with repairing complex fractures in and around the foot area of a patient such as the large calcaneus bone of the heel. Generally, when applying a calcaneal plate to the calcaneus, the heel area of a patient is covered with skin. Surgeons typically incise the skin in the calcaneal area. After choosing an appropriately sized calcaneal plate for the patient, the surgeon slides the calcaneal plate underneath the underlying skin and muscle. The surgeon then drills pilot holes into the calcaneus bone positioned relative to retaining holes in the plate and subsequently connects the plate to the bone using retaining screws that pass through the retaining holes. Because the bone is not visible, it is not easy to determine where to drill the pilot holes and where to start the screws to fit the screws to the plate. The prior art has provided guide tools for this purpose. Some known guide tools are specific to the plate size.

A calcaneal plate insertion tool is now provided. The tool includes various features and in one embodiment includes a body portion, a plate retainer assembly coupled to the body portion, a sled coupled to the body portion and movable relative to the body portion and having a guide portion, and a lock coupled to the body portion. The lock is operable between a lock position and an unlocked position wherein the lock impedes movement of the sled relative to the body portion when in the lock position. The sled may be indexed for locking into one of plural locking positions corresponding to different calcaneal plate sizes. The tool is intended for securement to at least one size and preferably plural sizes of calcaneal plates. The guide includes a gang positioned for placement over a retaining hole in the plate, and via adjustment of the sled and locking of the sled into one of the indexed positions, the guide can be positioned over plates of various sizes. Relatedly, the calcaneal plate inserter tool may comprise a body portion, a plate retainer assembly coupled to the body portion, the plate retainer assembly including a coupling drill guide that is axially movable relative to the body portion, and a lock coupled to the body portion and operable between a lock position and an unlocked position, the lock, when in the lock position, impeding axial movement of the coupling drill guide. The disclosure also contemplates an assembly that includes a heretofore described calcaneal plate insertion tool attached to a calcaneal plate. Also disclosed are a kit that includes the tool and at least one plate, a method for assembling the tool and plate, and a surgical method that includes using the plate to place the tool, as described herein.

BRIEF DESCRIPTION OF THE DRAWINGS

FIG. 45 is a top plan view of a lower layer of the two layer kit for which FIG. 44 illustrates the upper portion.

Figure 1:
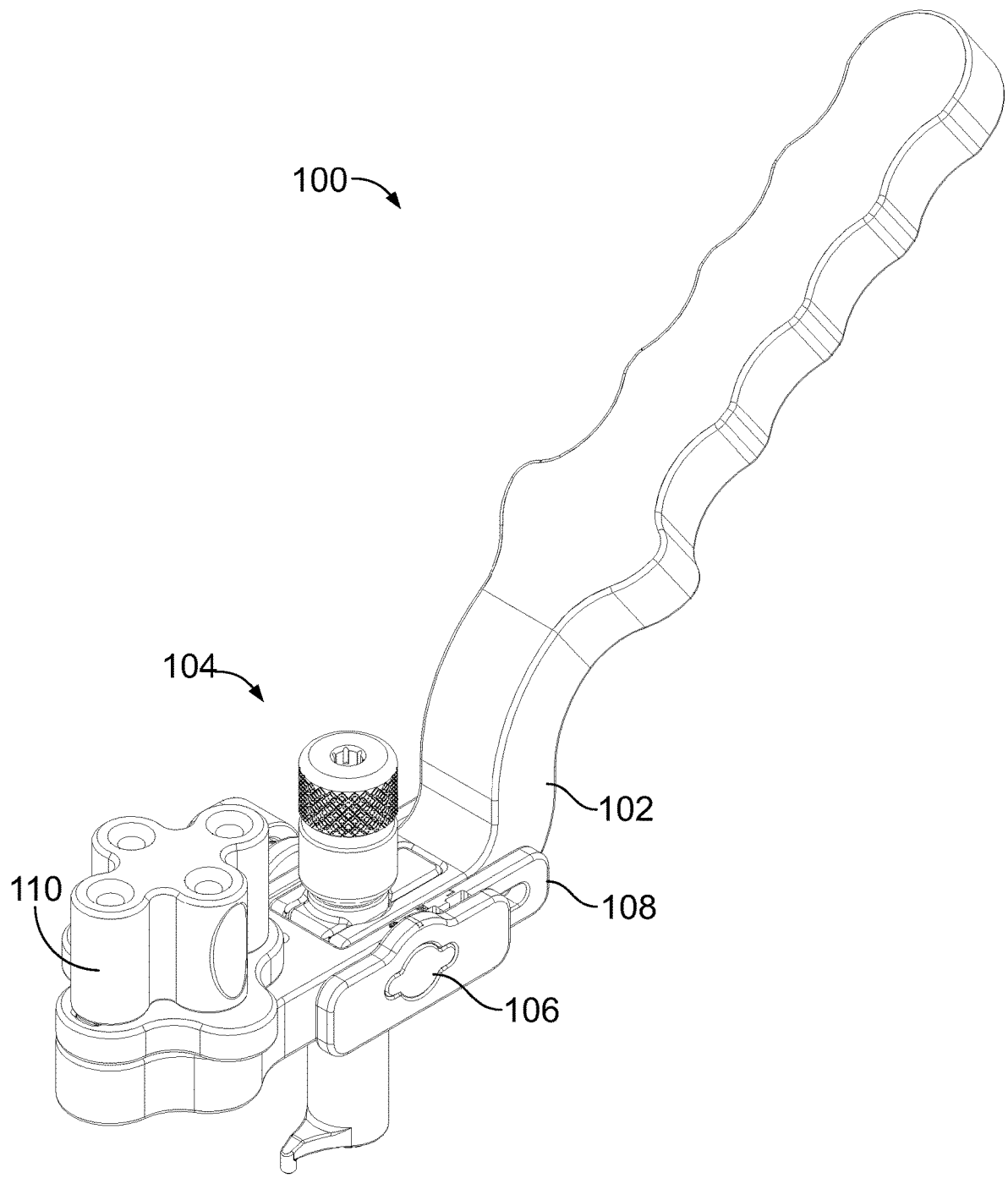
FIG. 1 is an isometric view of a calcaneal plate inserter tool according to a representative embodiment.
Figure 2:
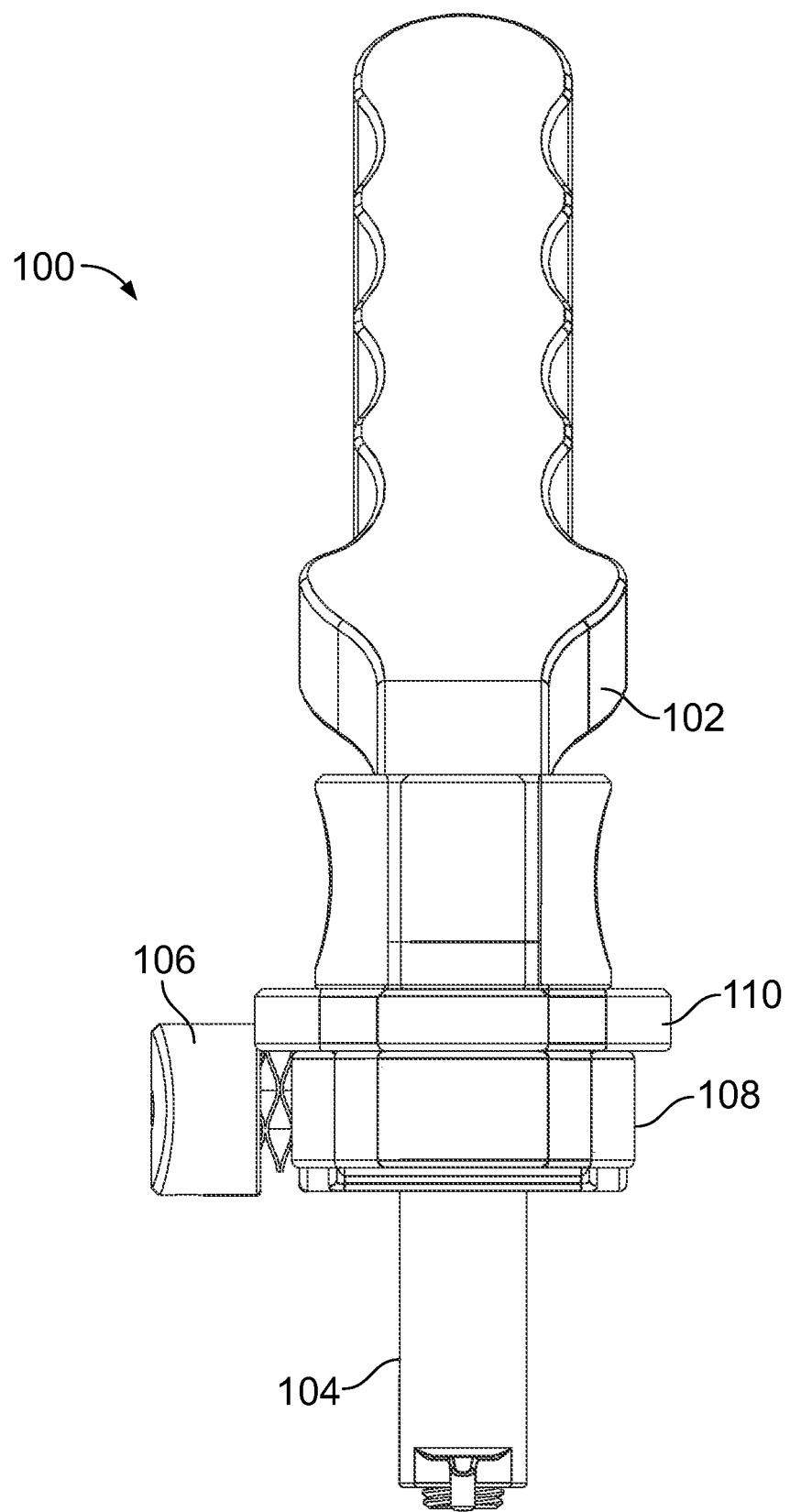
FIG. 2 is a front elevation of the calcaneal plate inserter tool of FIG. 1.
Figure 3:
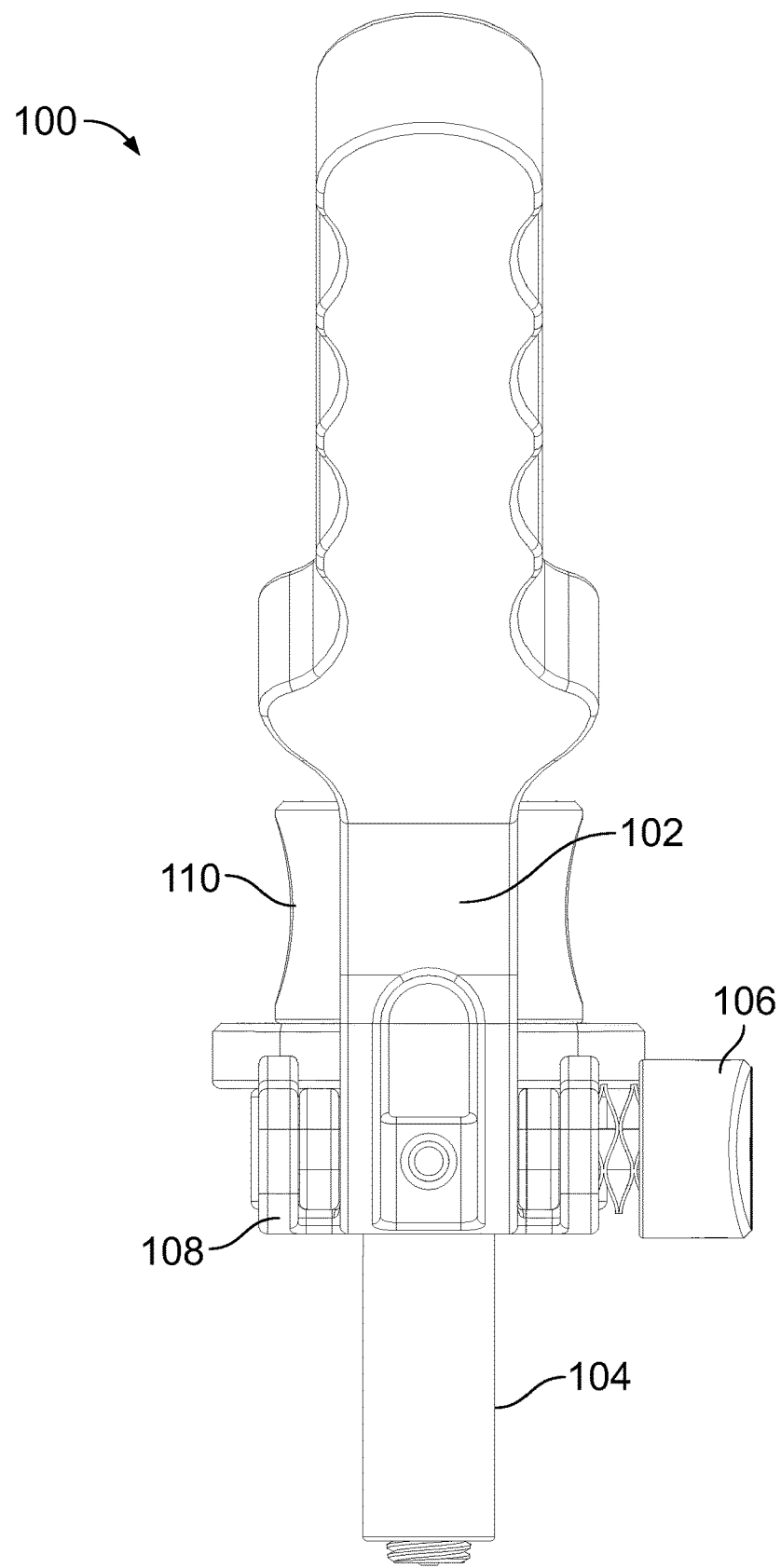
FIG. 3 is a rear elevation of the calcaneal plate inserter tool of FIG. 1.
Figure 4:
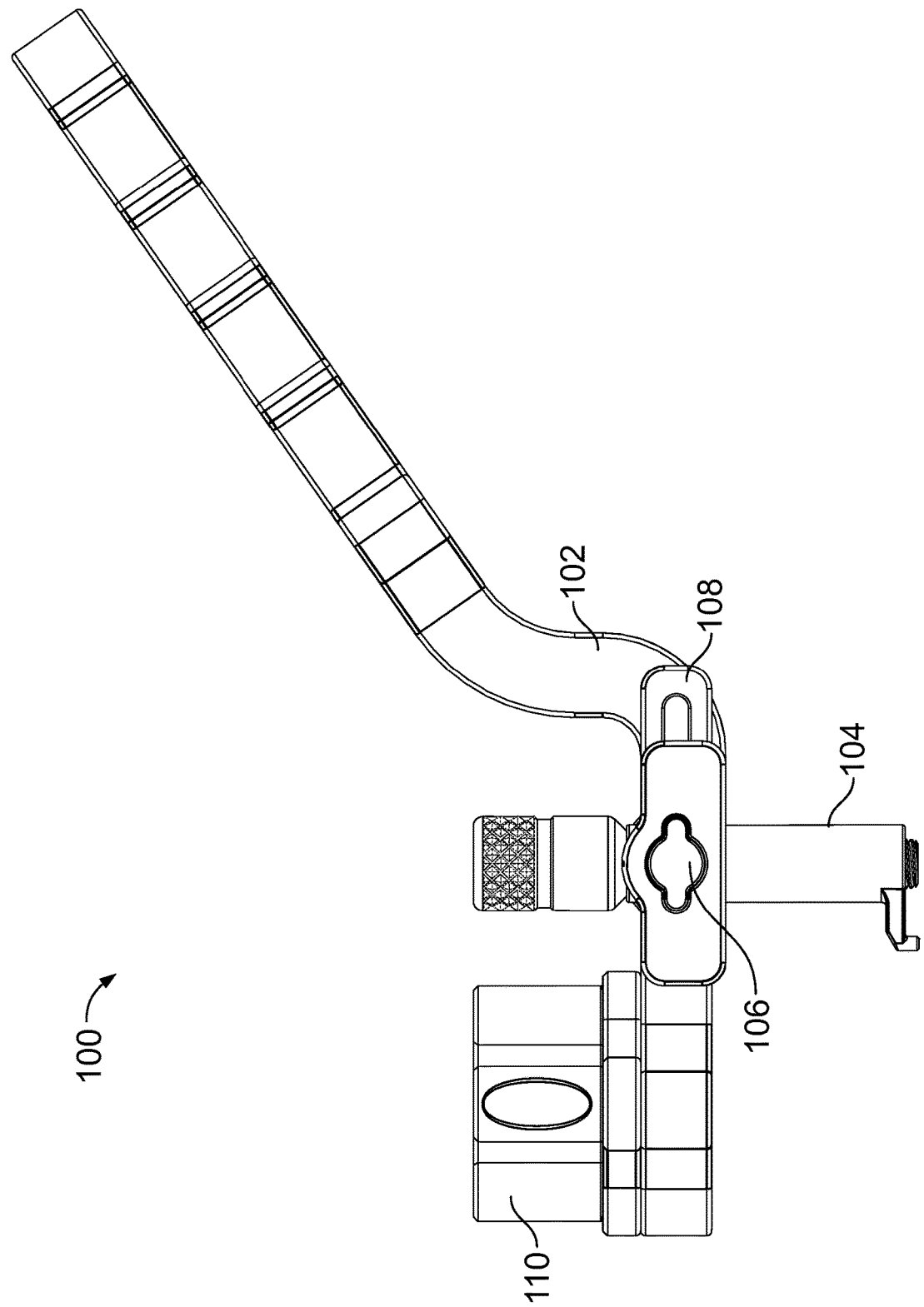
FIG. 4 is a first side elevation of the calcaneal plate inserter tool of FIG. 1.
Figure 5:
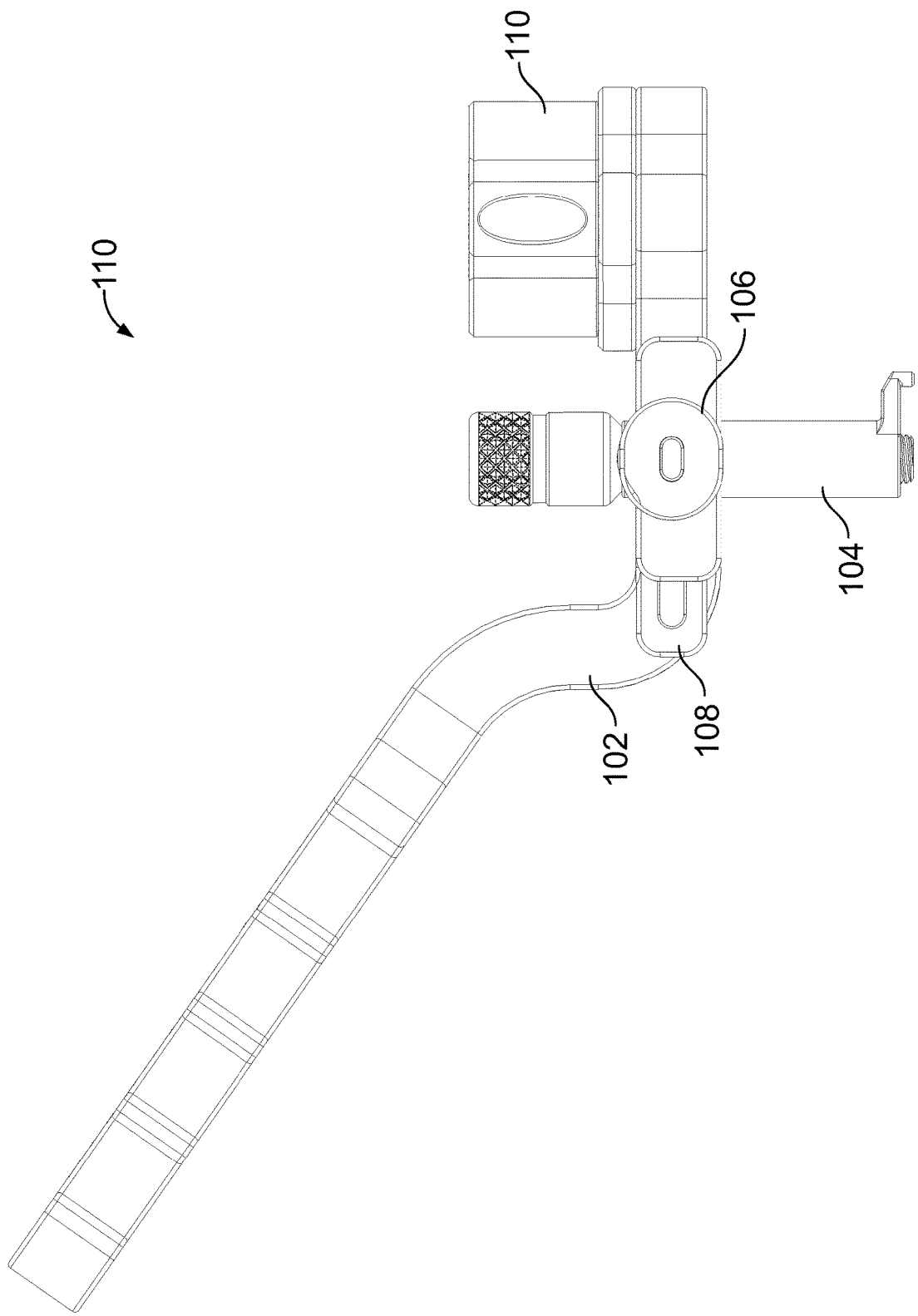
FIG. 5 is a second side elevation of the calcaneal plate inserter tool of FIG. 1.
Figure 6:
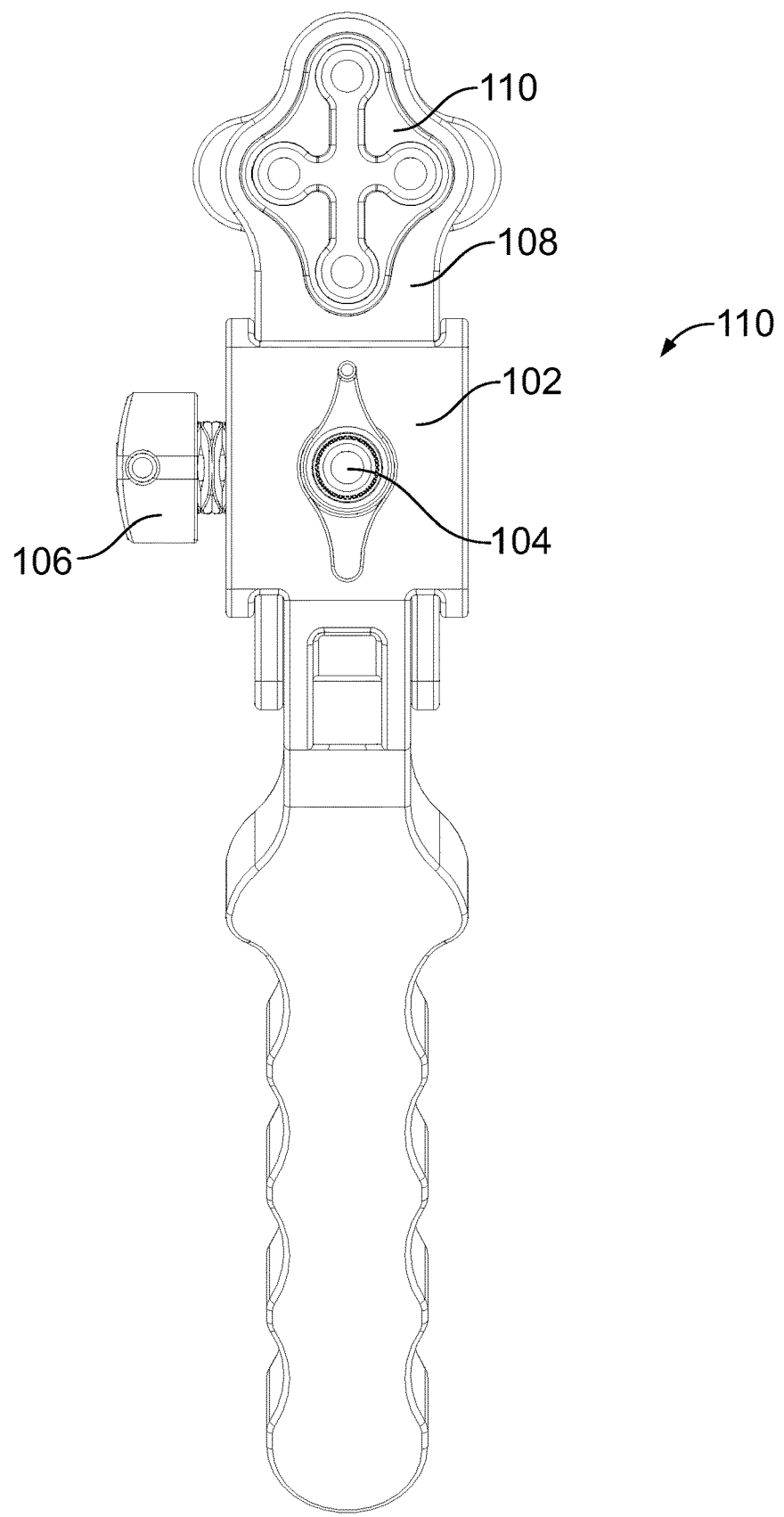
FIG. 6 is a bottom plan of the calcaneal plate inserter tool of FIG. 1.
Figure 7:
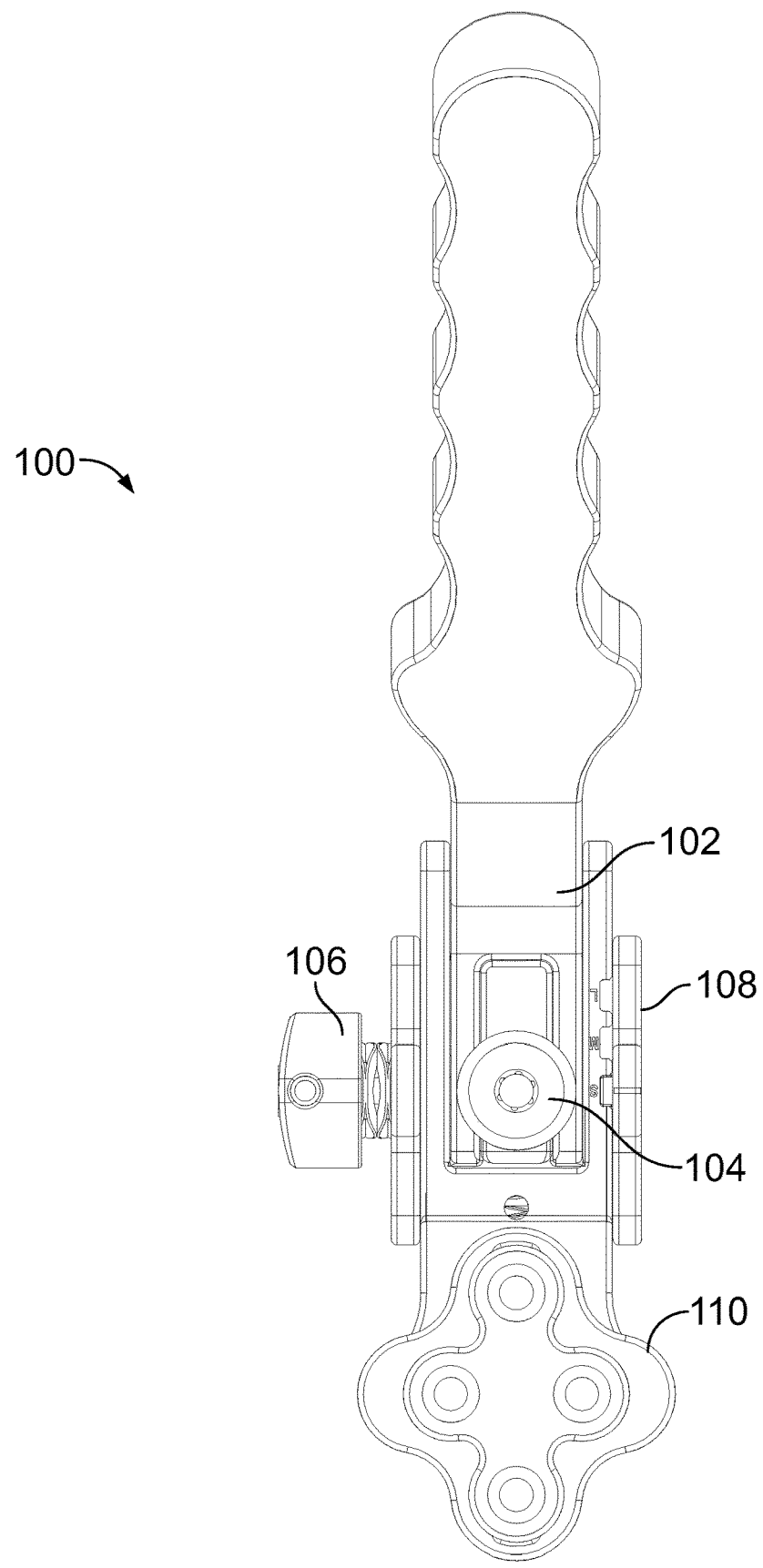
FIG. 7 is a top plan of the calcaneal plate inserter tool of FIG. 1.

Terms of orientation are for convenient reference to the Figures. In practice, the calcaneal plate inserter tool is omnidirectional and may be oriented in other positions.

DETAILED DESCRIPTION

With reference to FIGS. 1-7, the calcaneal plate inserter tool 100 as illustrated includes a body portion 102, a plate retainer assembly 104, a lock 106, a sled 108, and a gang guide 110, the features and functions of each which will be described below. Generally, the body portion 102 is manipulable by the surgeon in the placement of a calcaneal plate. The plate retainer assembly 104 removably secures the tool 100 to a calcaneal plate (not shown in FIGS. 1-7). The sled 108 is movable relative to the plate and cooperates with the lock 106 to secure the sled 108 relative to the body portion in one of a plurality of indexed positions. The sled 108 carries the gang guide 110 which moves with the sled into one of plural positions superior to the plate retained by the plate retainer assembly 104 such that the gangs of the guide align with retaining holes in the plate. Upon using the tool to place the plate adjacent to the calcaneus of a patient, the surgeon uses the gang guide 110 to drill pilot holes and subsequently can use the inferior screw guide to assist with placement of the securement screws. The surgeon then disconnects the tool 100 from the plate for the surgeon to finish the procedure.

Figure 8:
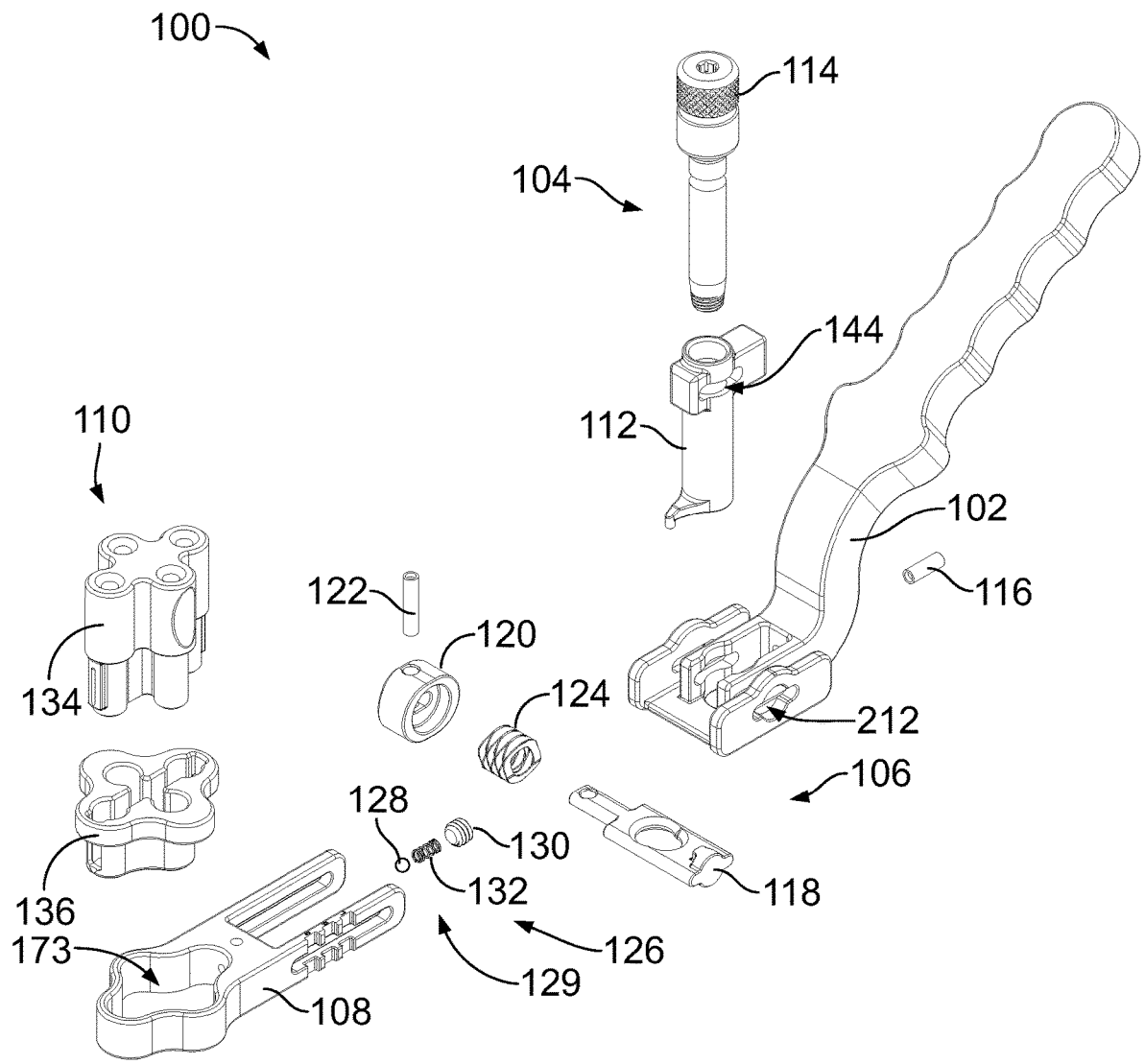
FIG. 8 is an exploded view of the calcaneal plate inserter tool of FIG. 1.
Figure 10:
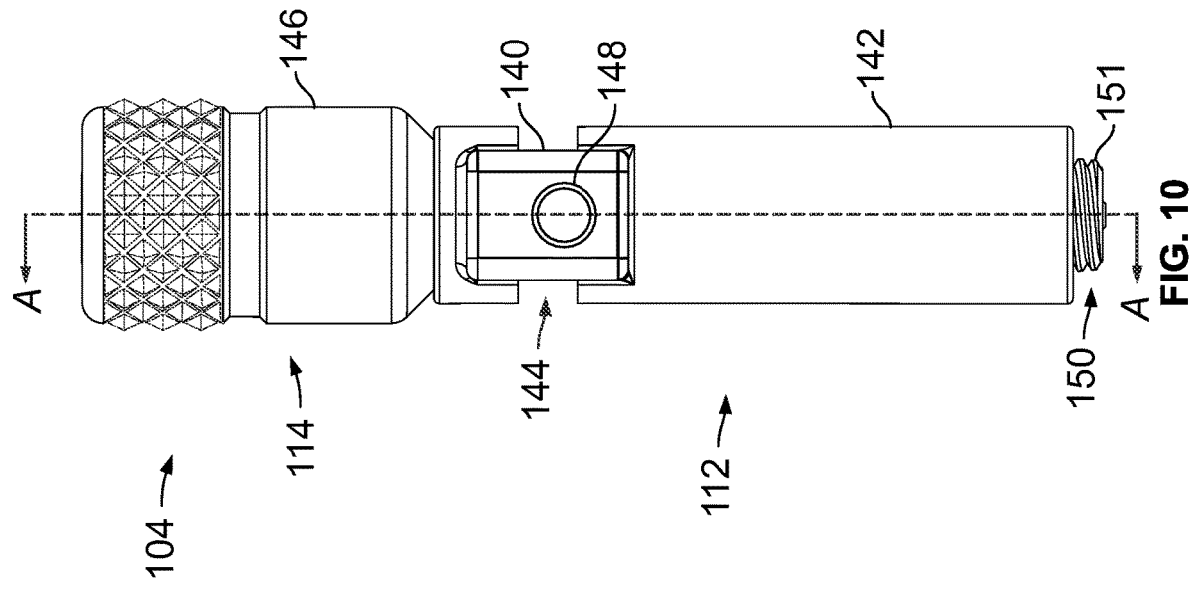
FIG. 10 is a rear elevation view of the plate retainer assembly of FIG. 9.
Figure 9:
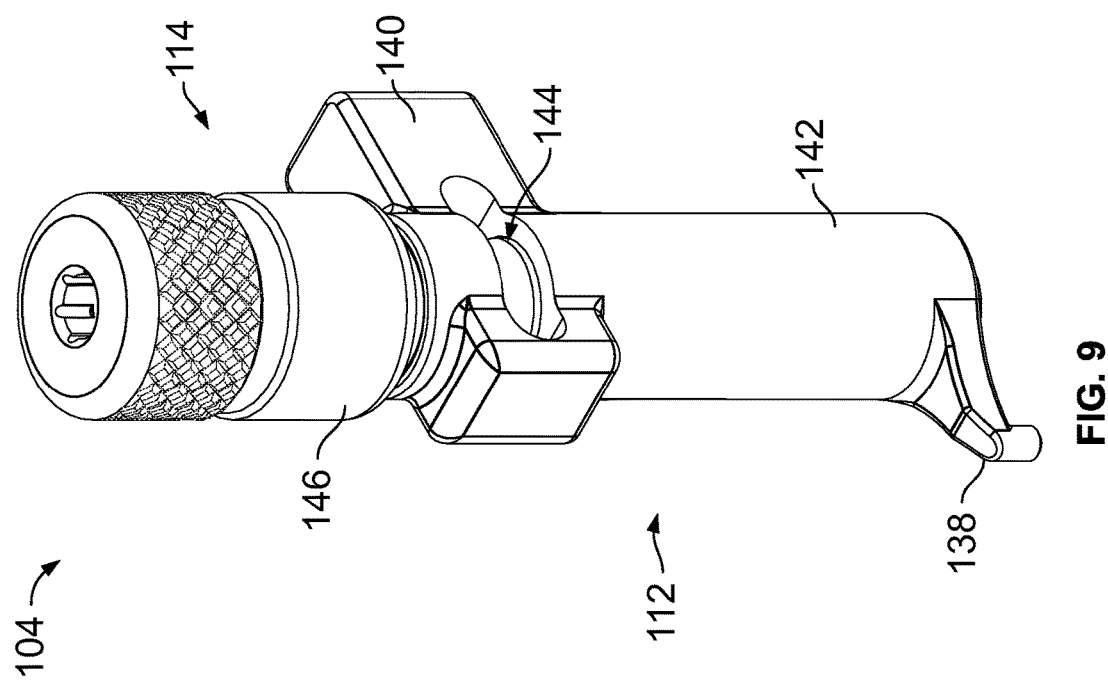
FIG. 9 is an isometric view of the plate retainer assembly of the calcaneal plate inserter tool of FIG. 1.

Continuing to FIG. 8, the illustrated plate retainer assembly 104 includes a sleeve 112 and a coupling drill guide 114. The coupling drill guide 114 is sized to pass through an interior cannula 152 (see FIG. 11) of the sleeve 112. Further, the sleeve 112 rests within a region 210 of the body portion 102 and is secured thereto by a fastener 116 As further seen in FIG. 8, the lock 106 includes a slider 118, and a button 120 that is secured to the slider 118 via a retention pin 122. Further, the lock 106 includes a biasing element 124 disposed between the slider 118 and the button 120. The biasing element 124 cooperates with the button 120 to disengage the lock 106 from a lock position. The lock 106 is configured to pass through an opening 212 in the body portion 102 and a gap 144 in the sleeve 112 when the calcaneal plate inserter tool 100 is assembled.

Further, the calcaneal plate inserter tool 100 includes a retention feature 126 of the sled 108. The retention feature 126 includes a ball 128, a set screw 130, and a spring 132 positioned between the ball 128 and the set screw 130 to form a ball plunger mechanism 129. The retention feature 126 is configured to removable secure the gang guide 110 within a guide region 173 of the sled 108. As seen in FIG. 8, the gang guide 110 includes a drill guide 134 and a screw guide 136. As described in more detail below, the screw guide 136 can be configured to nest within the guide region 173 and the drill guide 134 can be configured to nest within the screw guide 136.

Figure 11:
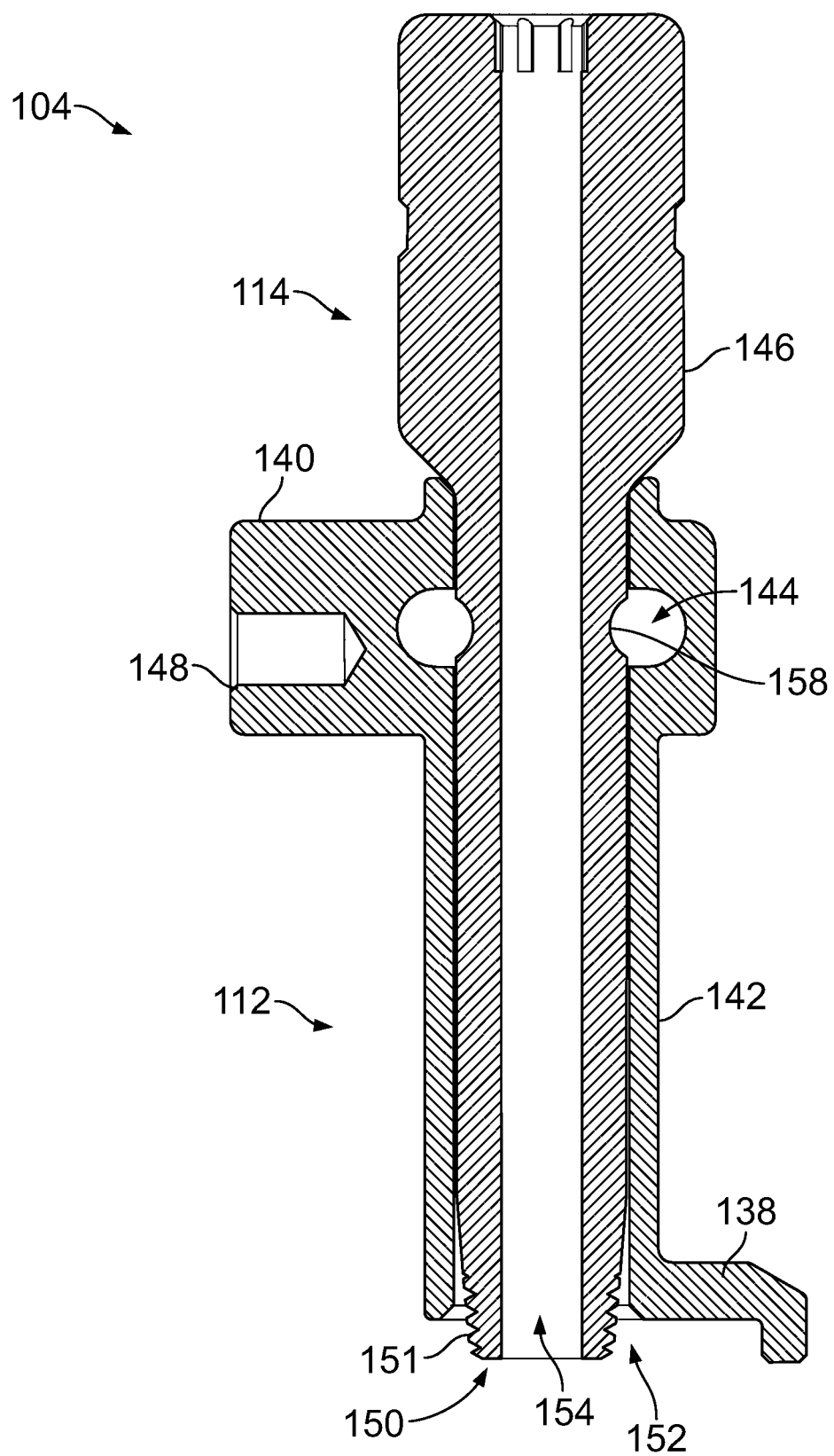
FIG. 11 is a cross-section of the plate retainer assembly of FIG. 10, taken along the line A-A in FIG. 10.
Figure 13:
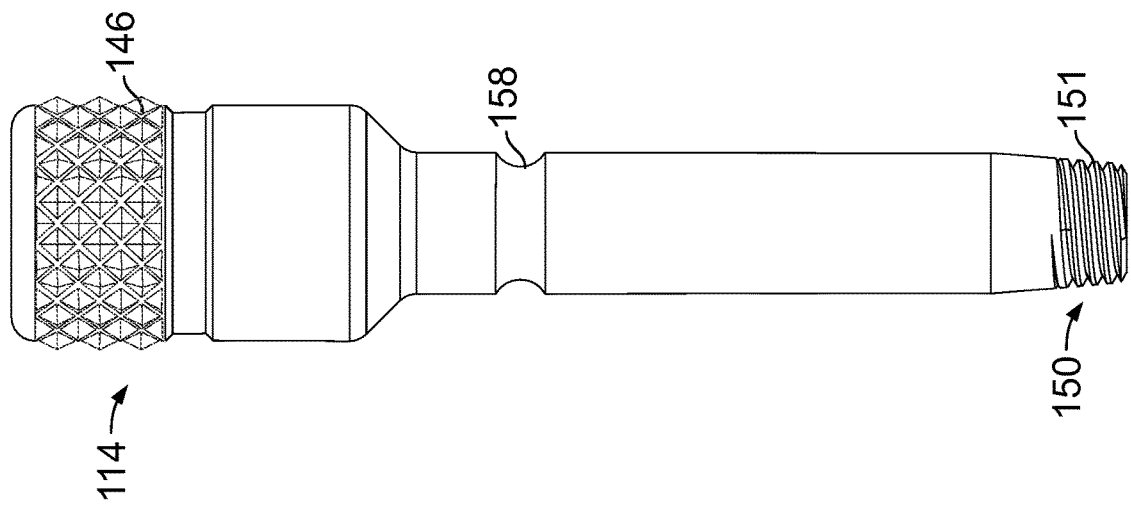
FIG. 13 is a front elevation of the coupling drill guide of the plate retainer assembly of FIG. 9.

With reference to FIGS. 9-13, the sleeve 112 of the plate retainer assembly 104 includes a foot 138, a support section 140, and a tower section 142 that couples the foot 138 to the support section 140. The support section 140 includes the gap 144 formed therein. The coupling drill guide 114 includes a knurled proximal operator grip 146 used to manually turn the coupling drill guide 114 and a distal end 150 that includes a rotated inclined plane, or thread 151, for attaching to a mating threaded retention portion of a calcaneal plate. As would be understood by those having ordinary skill in the art, the threads 151 comprise a rotated inclined plane. The support section 140 includes a threaded aperture 148 for receiving the fastener 116 for securement of the sleeve 112 to the body portion 102. As seen in FIG. 11, the threaded distal end 150 passes through the interior cannula 152 of the sleeve 112 until the distal surface of the grip 146 engages the support section 140. The coupling drill guide 114 includes a hollow interior channel 154 provided to serve as a guide for drill bits used to drill pilot holes through retention holes in a calcaneal plate (e.g., drill bit 400 in FIG. 39). Further, as seen in FIGS. 11 and 13, the coupling drill guide 114 includes an axial groove 158 that is aligned with the gap 144 when the coupling drill guide 114 is fully inserted into the sleeve. The foot 138 includes an anti-rotation nub 156 that extends lower than the remainder of the foot 138 and the tower section 142.

Figure 14:
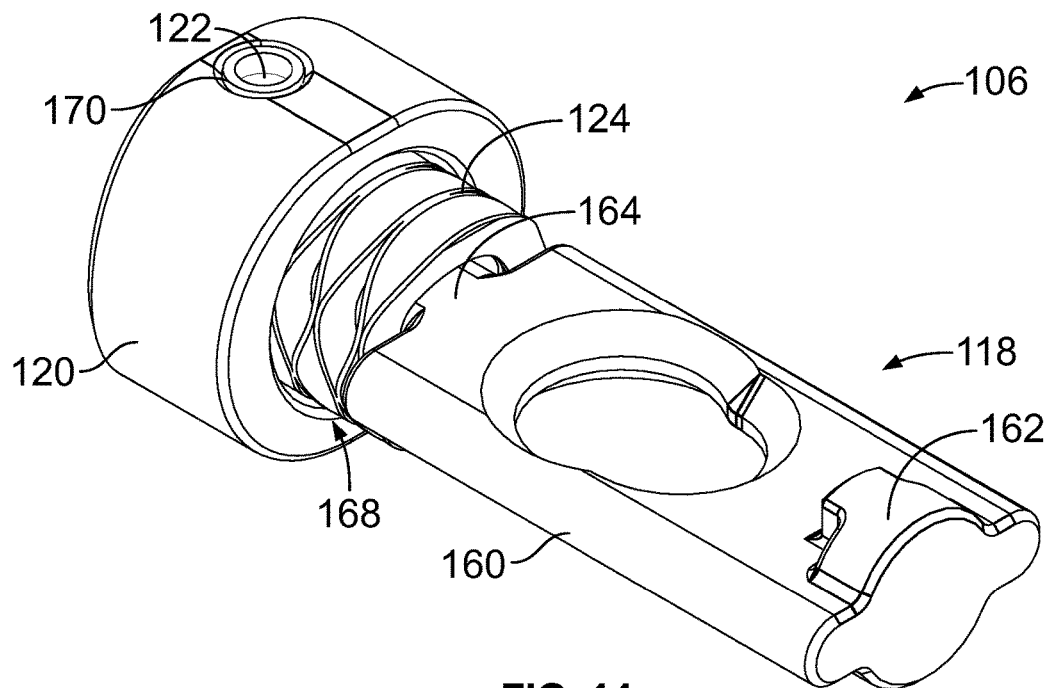
FIG. 14 is an isometric view of the lock of the calcaneal plate inserter tool of FIG. 1.
Figure 15:
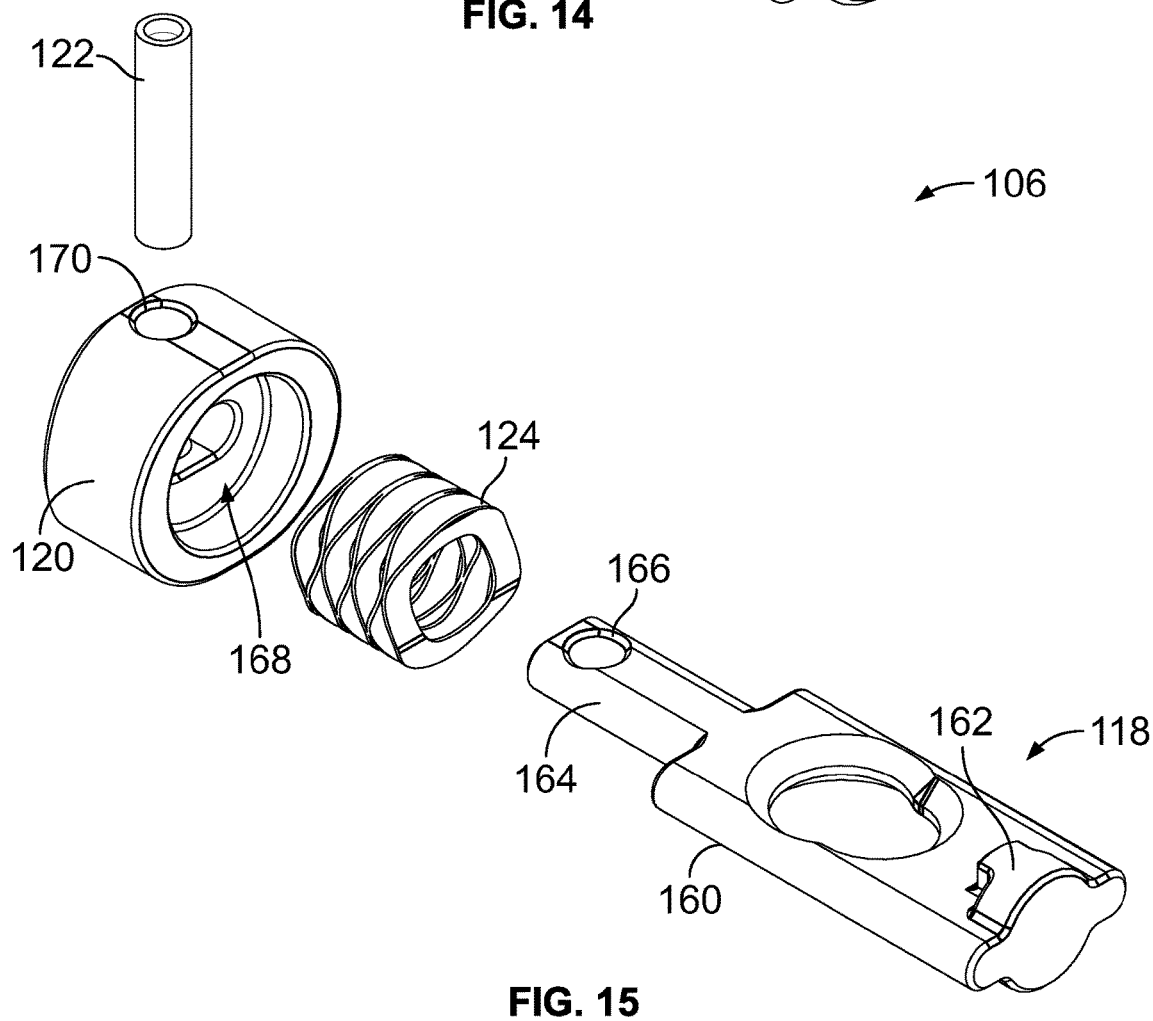
FIG. 15 is an exploded view of the lock of FIG. 14.

Turning now to FIGS. 14 and 15, the lock 106 comprises a slider 118 having a main body 160, a stop 162 integrally formed with the main body 160, and a distal end 164 that extends from the main body 160 through a biasing element 124 into an interior cavity 168 of a button 120. The interior cavity 168 also retains a portion of the biasing element 124 therein. The depicted biasing element 124 is a wire compression spring, but other configurations for the biasing element 124 are also contemplated. As seen in FIG. 15, the distal end 164 includes a passage 166 through which a retention pin 122 passes when the retention pin 122 is fed into the button 120 through aperture 170. The retention pin 122 secures the button 120 to the slider 118 and captures the biasing element 124 around the narrow distal end 164. Before the retention pin 122 is inserted, the main body 160 of the slider 118 is inserted through the gap 144 of the sleeve 112 (FIG. 17B) and the biasing element 124 is secured around the narrow distal end 164 as the narrow distal end 164 is inserted into the button 120. Then, the retention pin 122 is inserted through the aperture 170 and the passage 166 to secure the button 120 to the slider 118.

Figure 16:
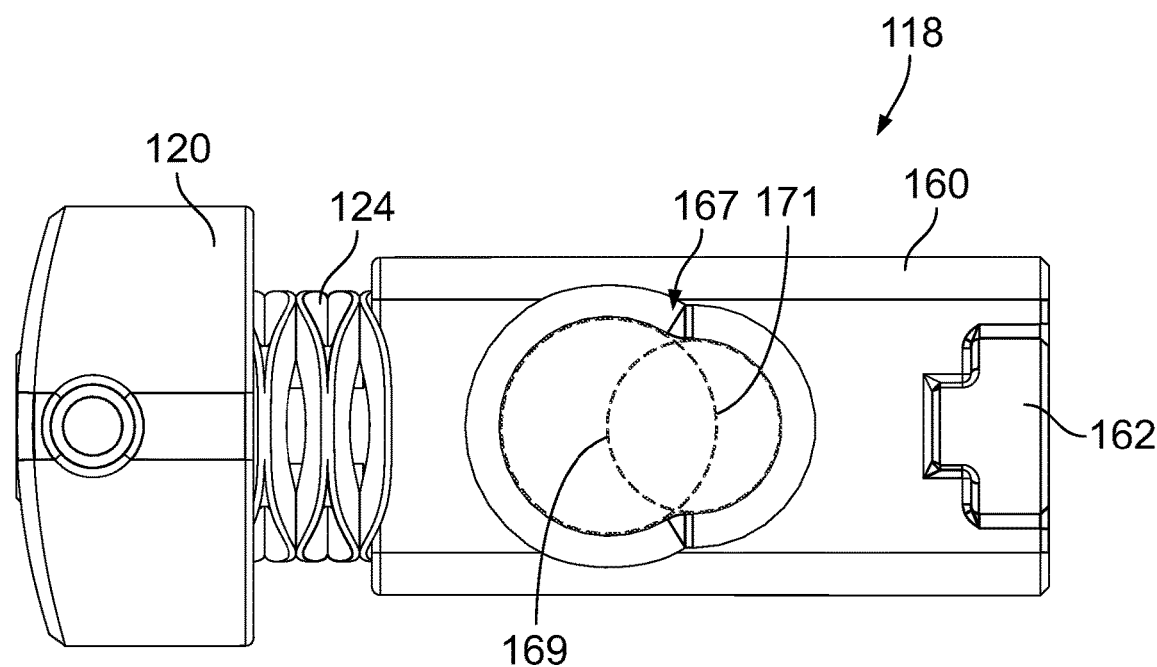
FIG. 16 is a top plan of the lock of FIG. 14.
Figure 17A:
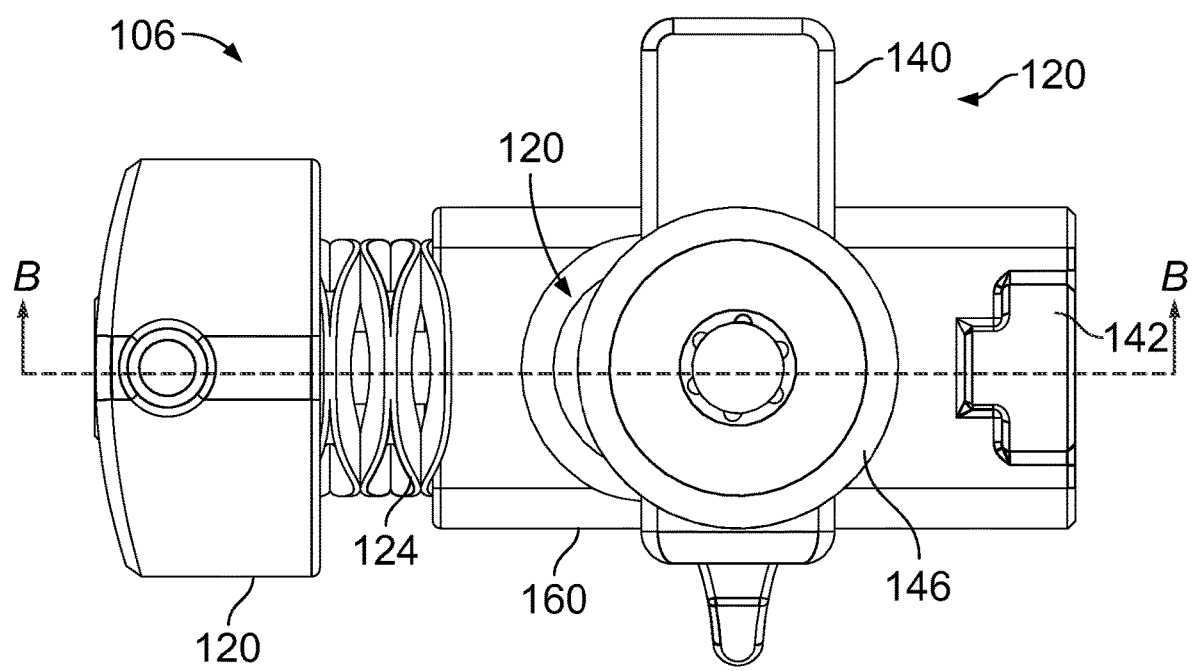
FIG. 17A is a top plan of the lock of FIG. 14 joined with the plate attachment unit of FIG. 9
Figure 17B:
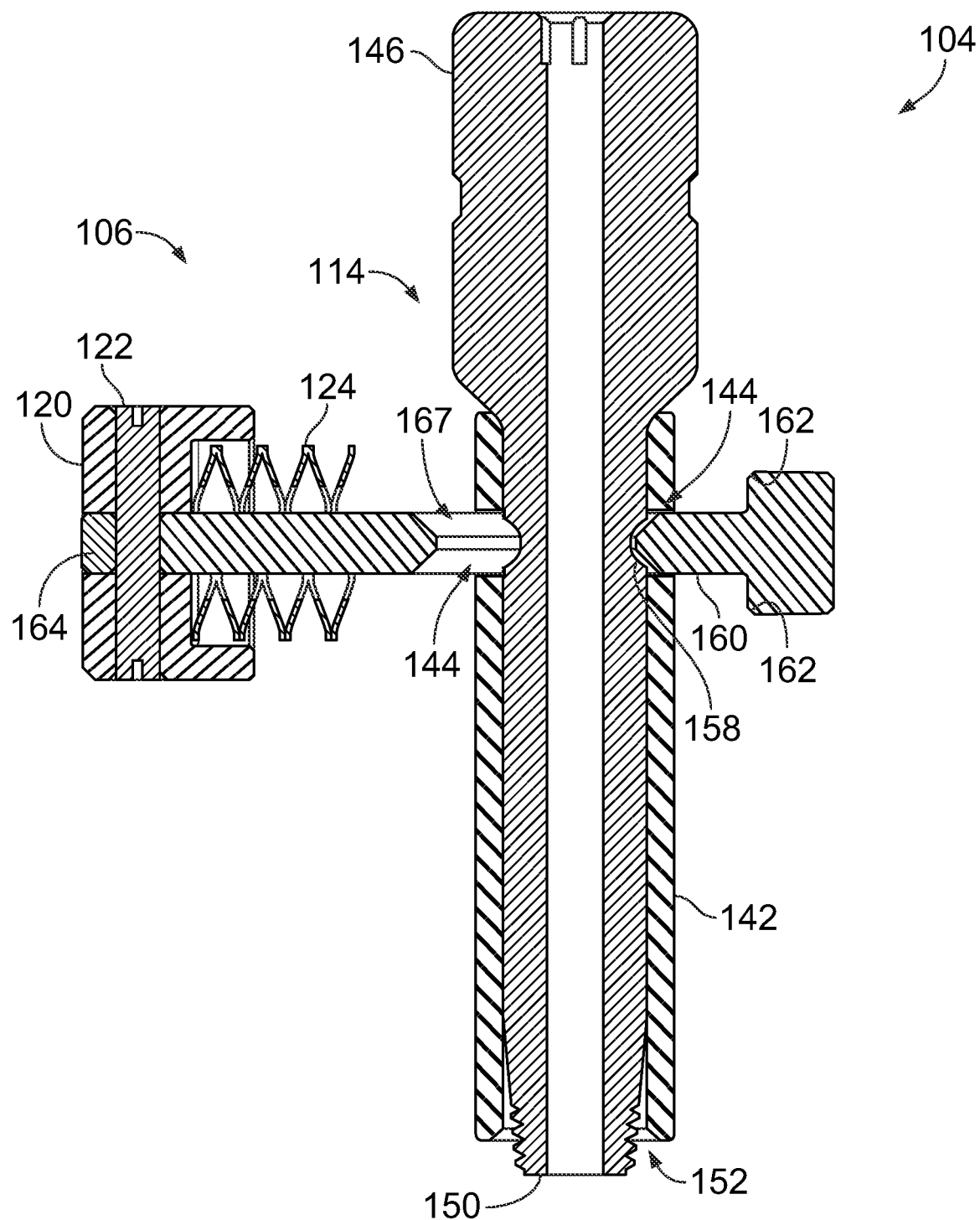
FIG. 17B is a cross-section of the lock and plate attachment unit along line B-B in FIG. 17A, showing the lock engaged and in the lock position.
Figure 17C:
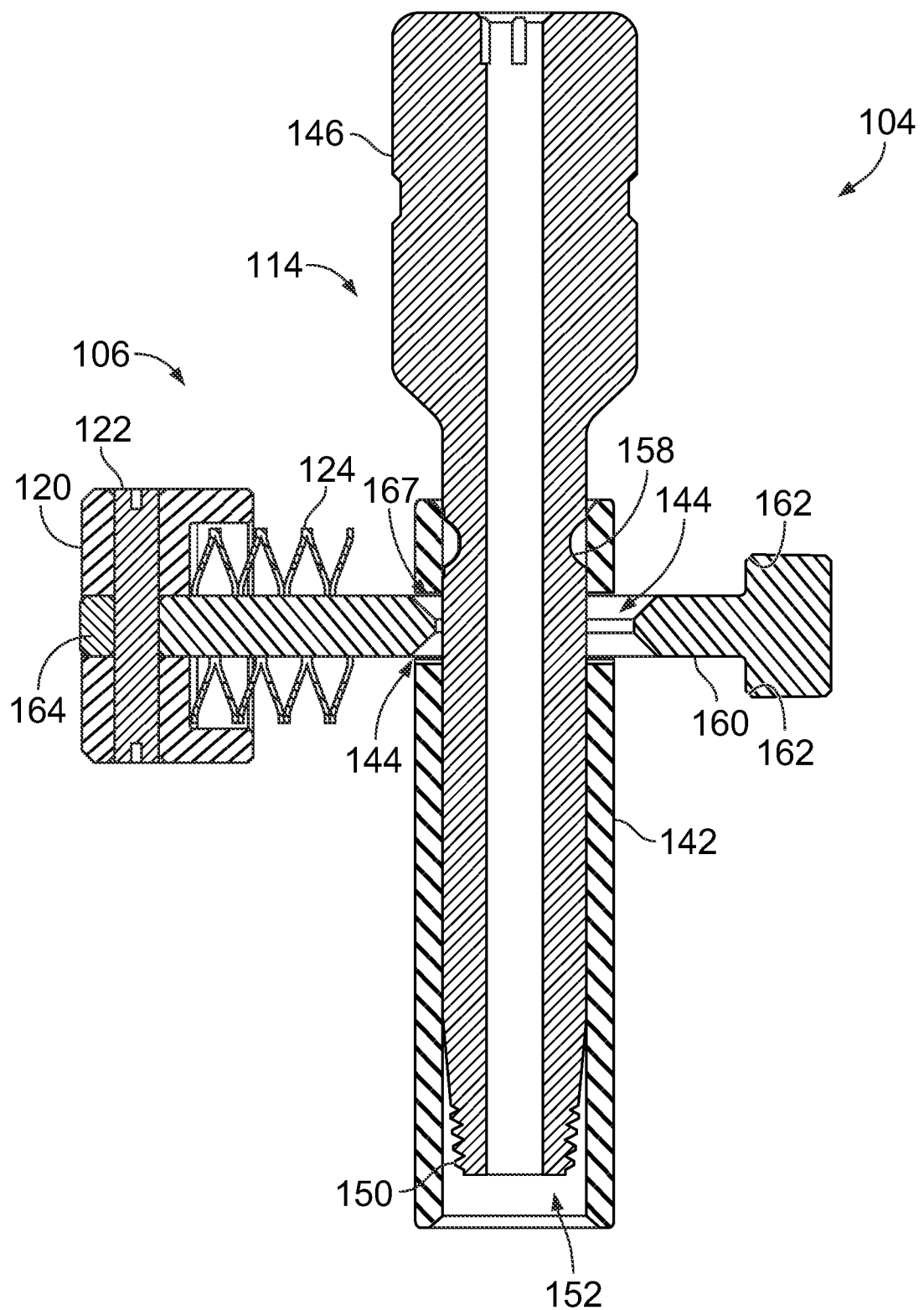
FIG. 17C is a cross-sectional view of the lock and plate attachment unit similar to FIG. 17A, except that the lock is shown disengaged.

Turning to FIGS. 16 and 17, the slider 118 includes an eccentric aperture 167 formed in the main body 160. The eccentric aperture 167 is formed from a smaller region 169 intercepted and interceded by a larger region 171, both regions partially circular in the illustrated embodiment, to form an intersecting geometric lens. The smaller region 169 is sized such that the main body 160 engages the axial groove 158 when the lock 106 is in the lock position to impede axial movement of the coupling drill guide 114 relative to the slider 118, as seen in FIGS. 17A and 17B. Conversely, the larger region 171 is sized to allow relative axial movement of the coupling drill guide 114 relative to the slider 118, as seen in FIG. 17C. Via this arrangement, when a surgeon depresses the button 120, the larger region 171 of the eccentric aperture 167 aligns with the cannula 152 (see FIG. 17C) to permit insertion of the coupling drill guide and connection of the distal end 150 to a calcaneal plate. After the coupling drill guide 114 is inserted and the button 120 is released, the smaller region 171 of the main body 160 engages the axial groove 158 (FIGS. 17A and 17B) to axially capture the coupling drill guide 114 and thereby impede axial movement of the coupling drill guide 114 relative to the sleeve 112.

Figure 18:
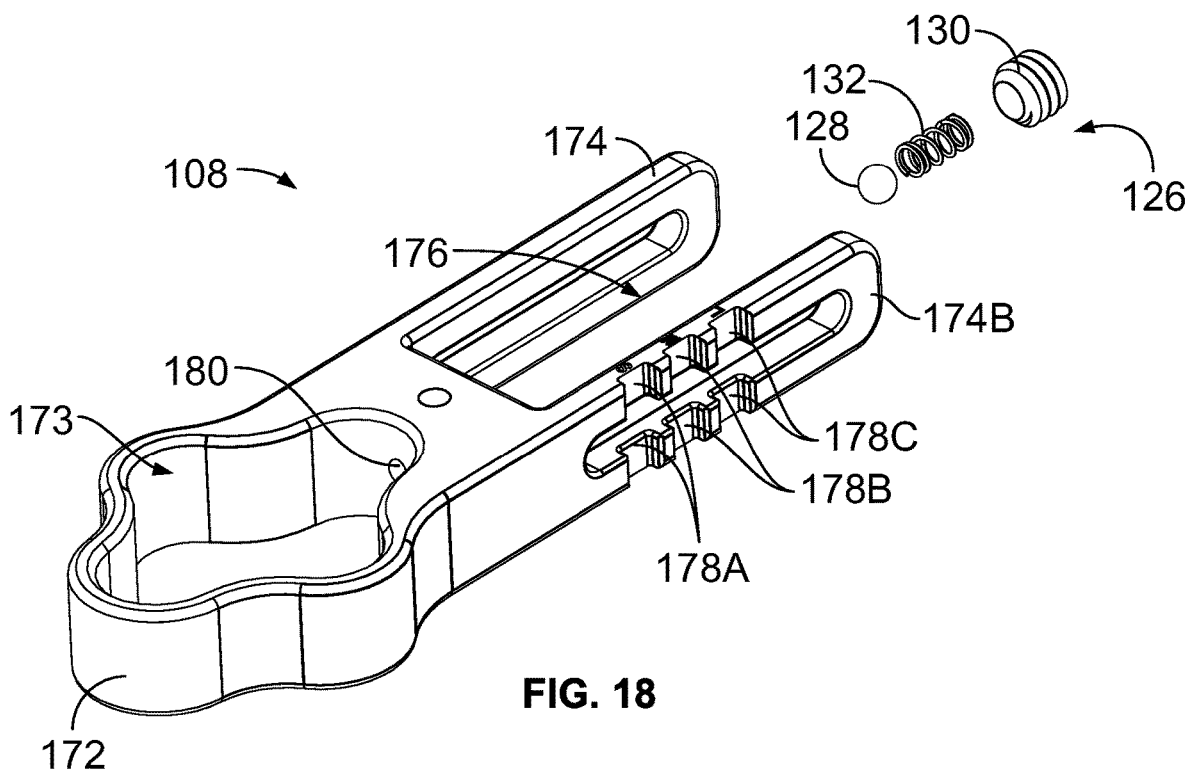
FIGS. 18 and 19 are exploded isometric views of the sled portion of the calcaneal plate inserter tool of FIG. 1, taken from different perspectives.
Figure 19:
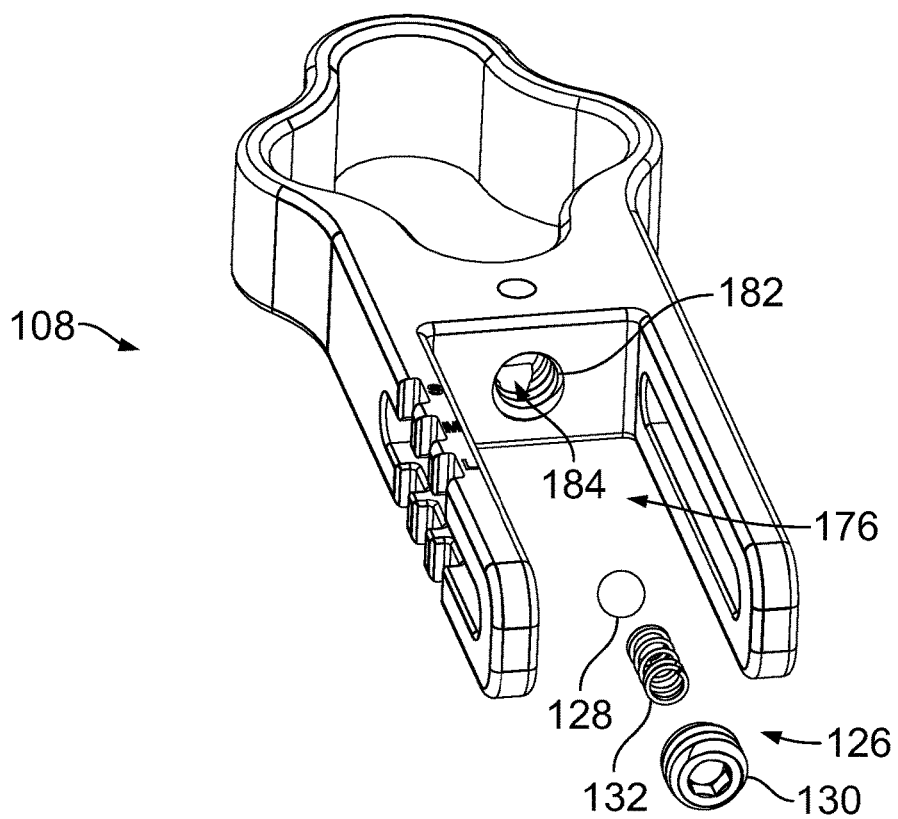
Figure 20:
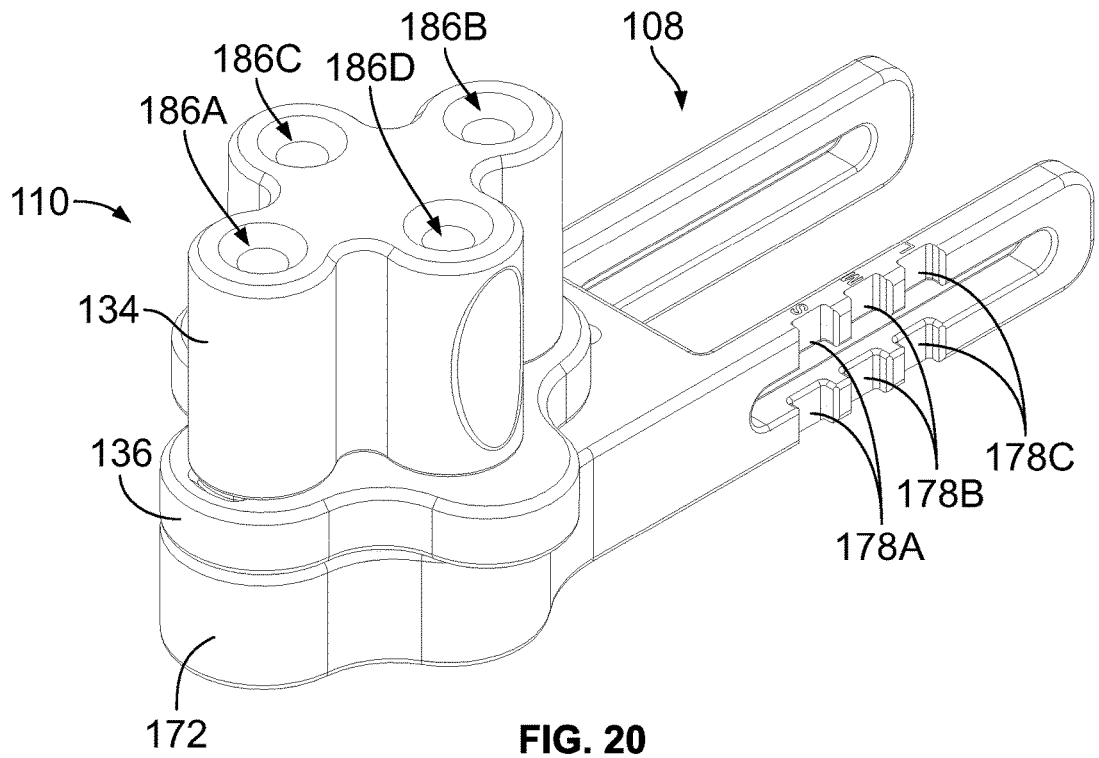
FIG. 20 is an isometric view of a subassembly of the calcaneal plate inserter of FIG. 1 that includes the sled portion shown in FIGS. 18 and 19 coupled to a gang guide.
Figure 21:
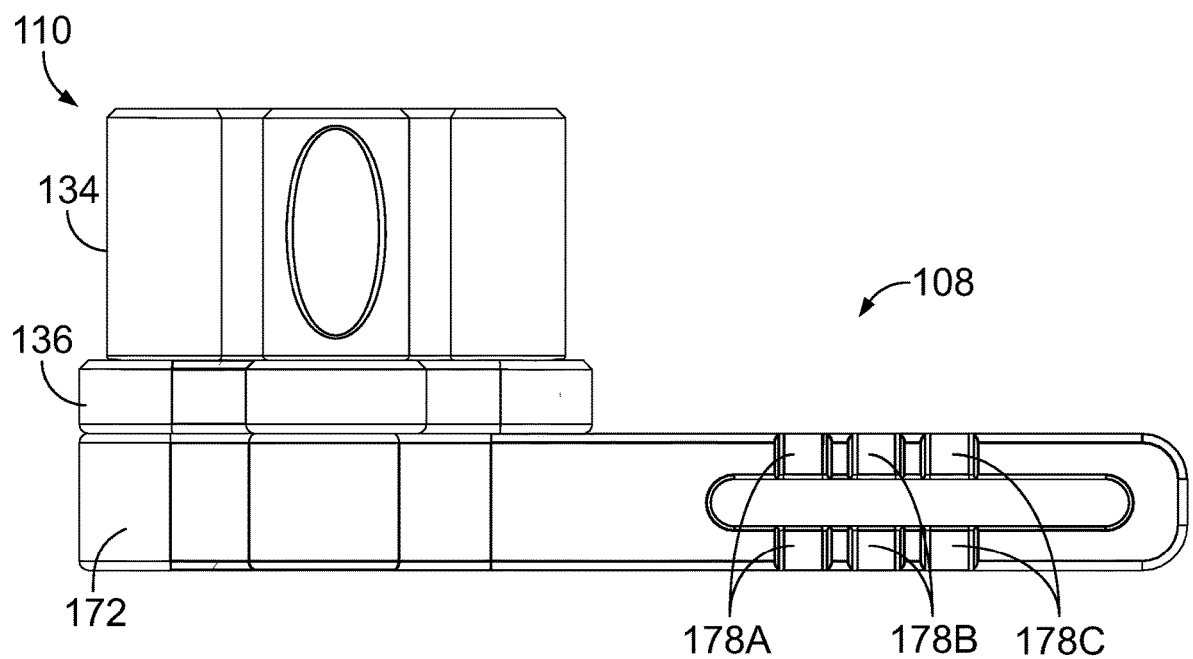
FIG. 21 is a side elevation of the subassembly of FIG. 20.
Figure 22:
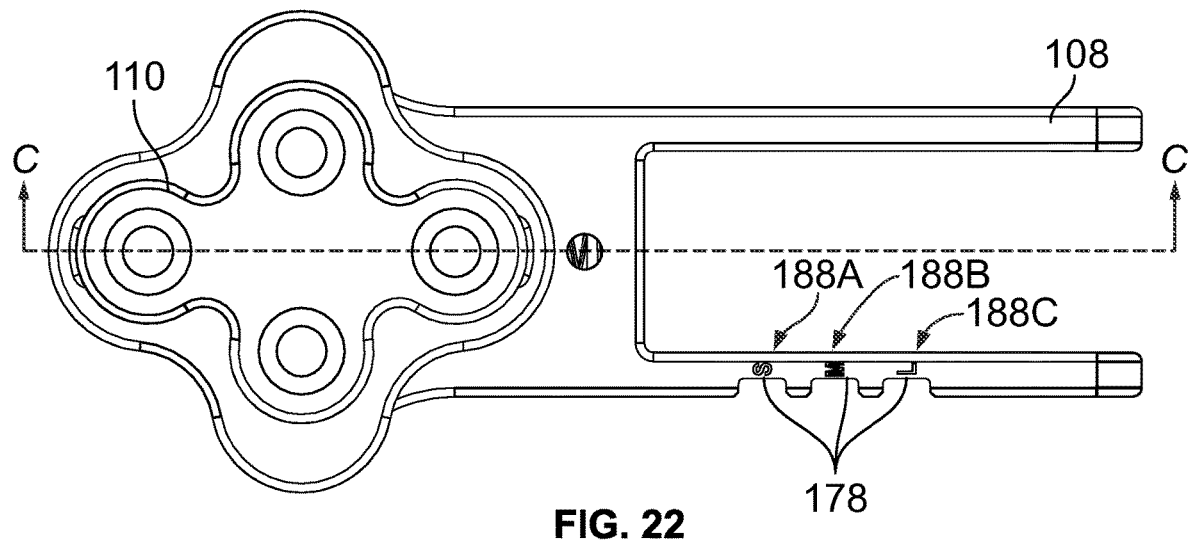
FIG. 22 is a top plan view of the subassembly of FIG. 20.
Figure 23:
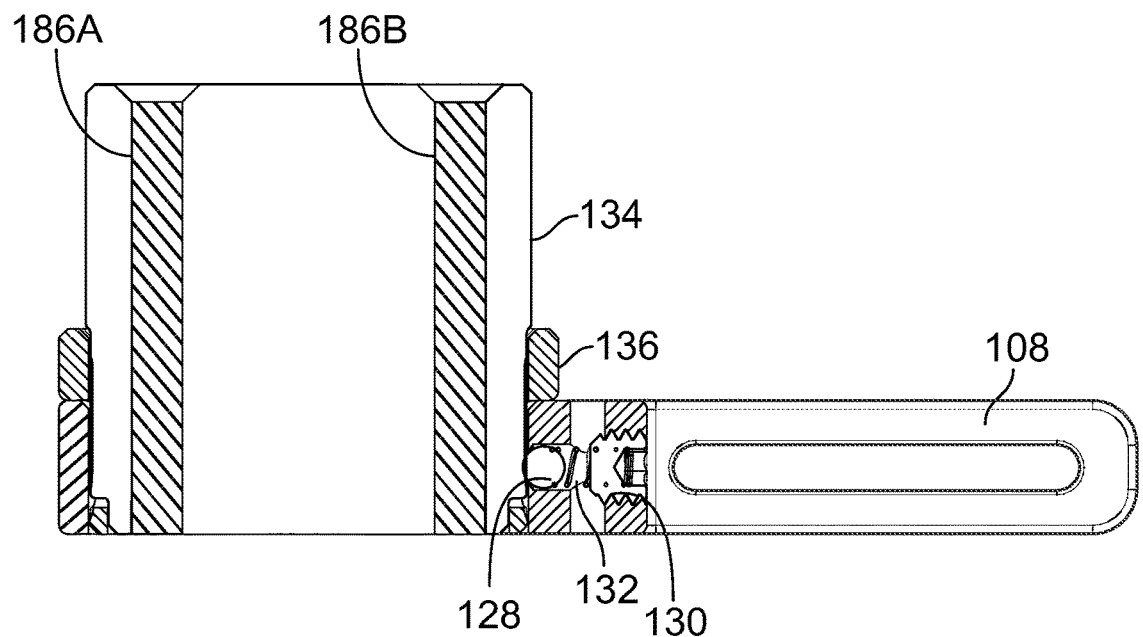
FIG. 23 is a cross-sectional view of the subassembly of FIGS. 20-22 taken along line C-C in FIG. 22.

Turning to FIGS. 18 and 19, the sled 108 includes a forward section 172 that defines the guide region 173 for accommodating the gang guide 110 (see FIGS. 20-21). The sled 108 includes a first arm 174A and a second arm 174B that define a yoke-like region 176 configured to receive a part of the body portion 102. The second arm 174B includes slots 178A, 178B, and 178C that are configured to receive the stop 162 of the lock 106 so that the sled 108 can be secured in indexed positions relative to the body portion 102. In particular, each of the slots 178A, 178B, and 178C correspond to a different indexed position of the sled 108. Further still, the sled 108 includes a forward aperture 180 and rear aperture 182 that define a passage 184 in which the retention feature 126 is secured. In particular, the rear aperture 182 includes threads that interface with the ball plunger mechanism 129.

Turning to FIGS. 20-23, the gang guide 110 rests within the sled 108 and includes drill bit guide channels 186A, 186B, 186C, and 186D as part of the drill guide 134. When the gang guide 110 is resting within the sled 108, the ball 128 protrudes slightly into the guide region 173 (see FIG. 18) to apply a retention force imparted by the spring 132 to the gang guide 110 such that the gang guide 110 remains stationary with respect to the guide region 173. The surgeon can manually apply a sufficient removal force to remove the gang guide 110.

Figure 24:
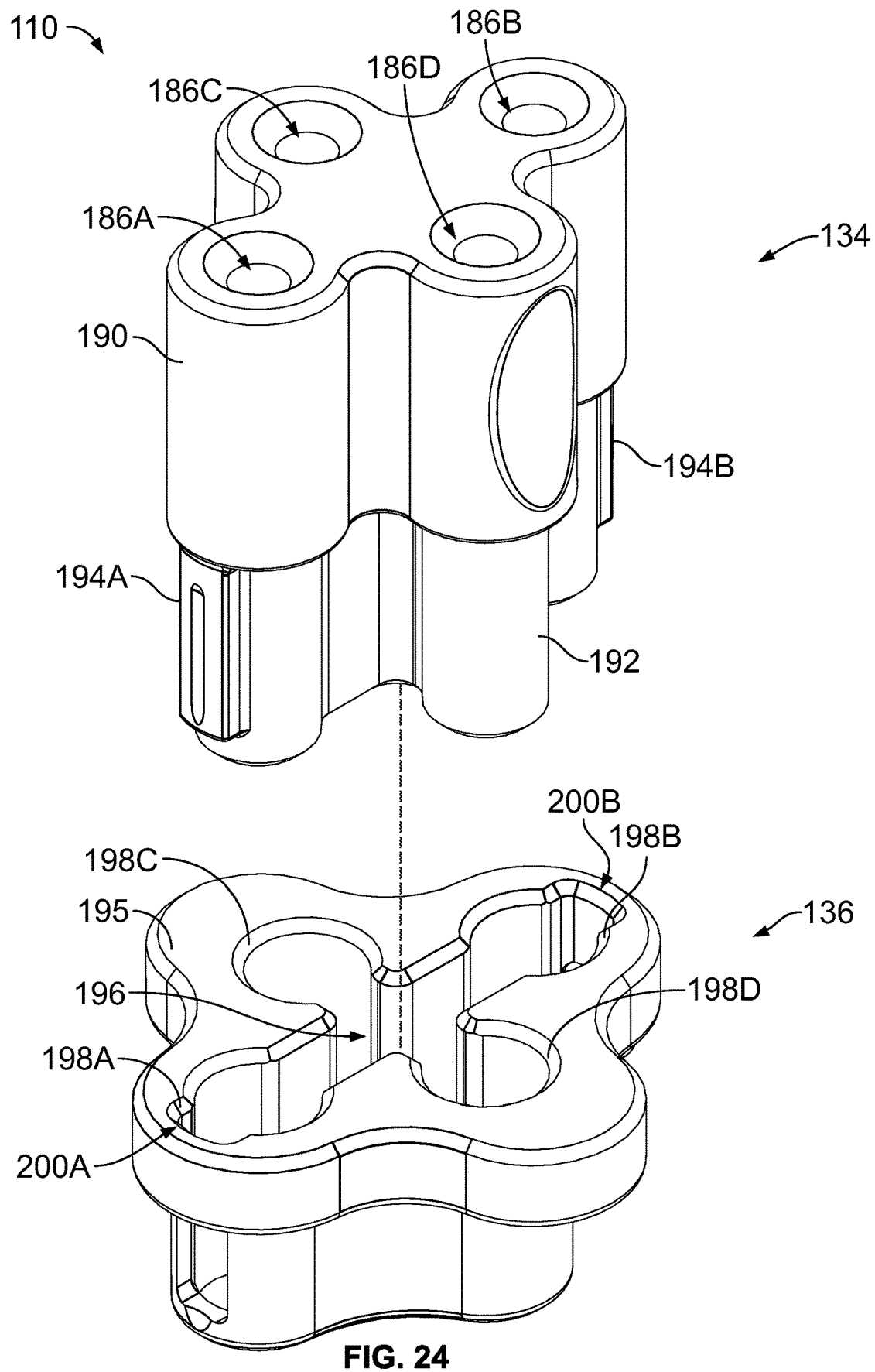
FIG. 24 is an exploded view of the gang guide shown in previous figures.
Figure 25:
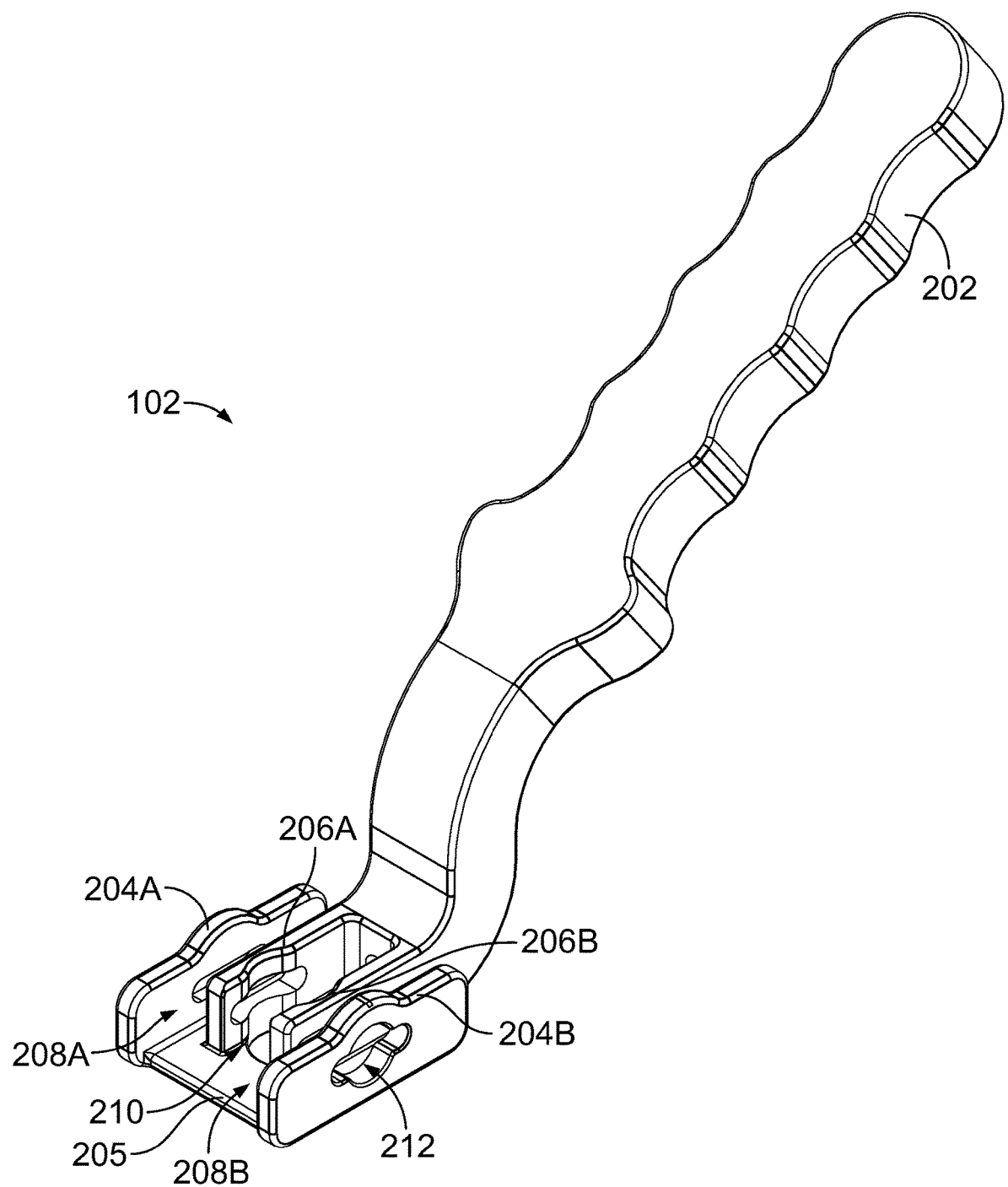
FIG. 25 is an isometric view of the body and handle of the calcaneal plate inserter tool of FIG. 1.

As seen in FIG. 24, the gang guide 110 includes the drill guide 134 and the screw guide 136. The drill guide 134 includes an upper region 190 and an inset lower region 192, the lower region 192 including retention tabs 194A and 194B. The screw guide 136 includes a top region 195 and an interior cavity 196 configured to receive and secure the lower region 192 while the upper region 190 rests on top of the top region 195. The interior cavity 196 also includes sections 198A, 198B, 198C, and 198A that receive portions of the lower region 192 respectively corresponding to the drill bit guide channels 186A, 186B, 186C, and 186D. The sections 198A, 198B, 198C, and 198A also act as guides for inserting screws into a patient as discussed in more detail below. The screw guide 136 includes orientation slots 200A and 200B that receive the retention tabs 194A and 194B respectively to impede rotation of the drill guide 134.

As shown in FIGS. 25-29, the body portion 102 includes an operator gripping handle 202 that is integrally formed with the remainder of the body portion 102. The operator gripping handle 202 could alternatively be separately formed and fastened to the remainder of the body portion 102. The body portion 102 includes exterior walls 204A and 204B and interior walls 206A and 206B that extend upward from the plate 205. The exterior wall 204A and the interior wall 206A define a first region 208A that receives the first arm 174A of the sled 108. Similarly, the exterior wall 204B and the interior wall 206B define a second region 208A that receives the second arm 174B of the sled 108. The interior walls 206A and 206B together define a region 210 that receives the support section 140 of the plate retainer assembly 104. Each of the walls 204A, 204B, 206A, and 206B has opening 212 defined therein through which the main body 160 of the lock 106 passes when the calcaneal plate inserter tool 100 is assembled.

Figure 12:
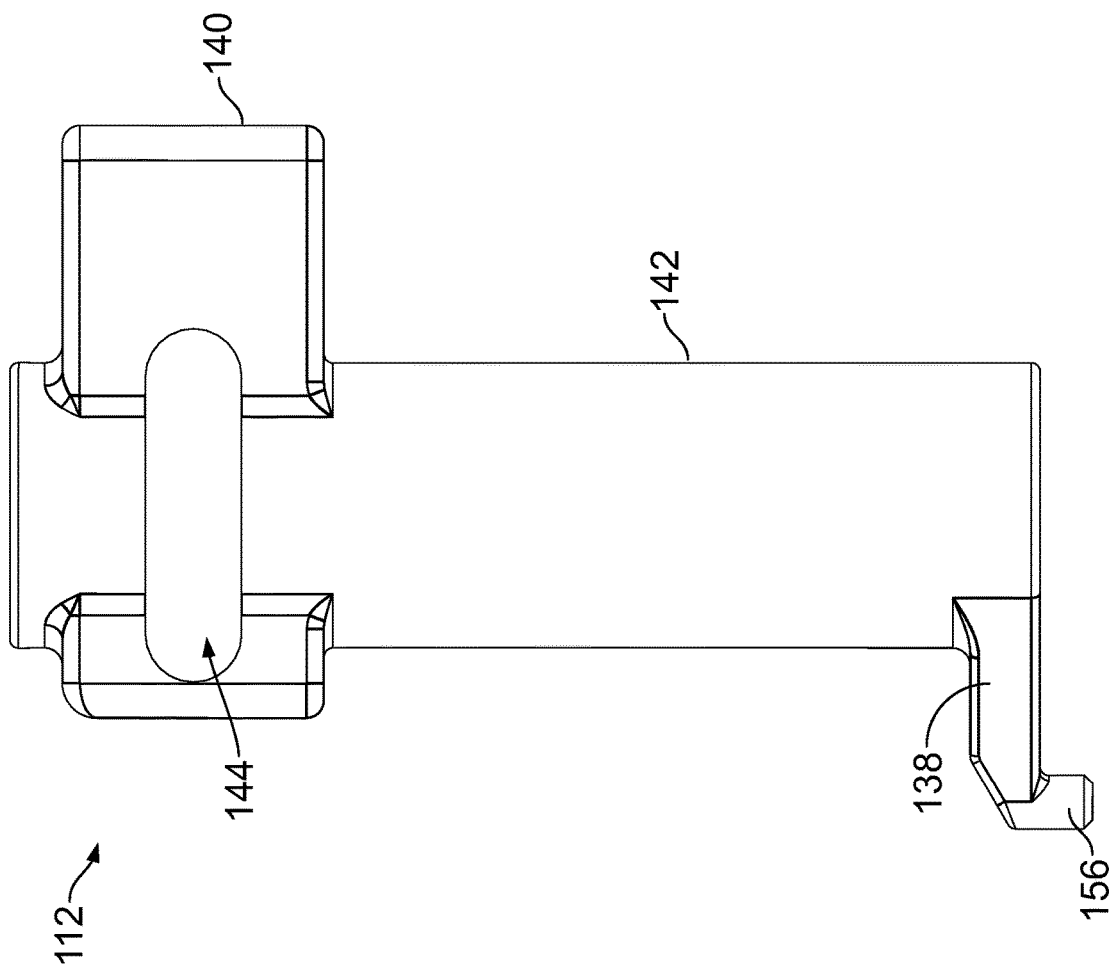
FIG. 12 is a side elevation of the sleeve of the plate retainer assembly of FIG. 9.
Figure 26:
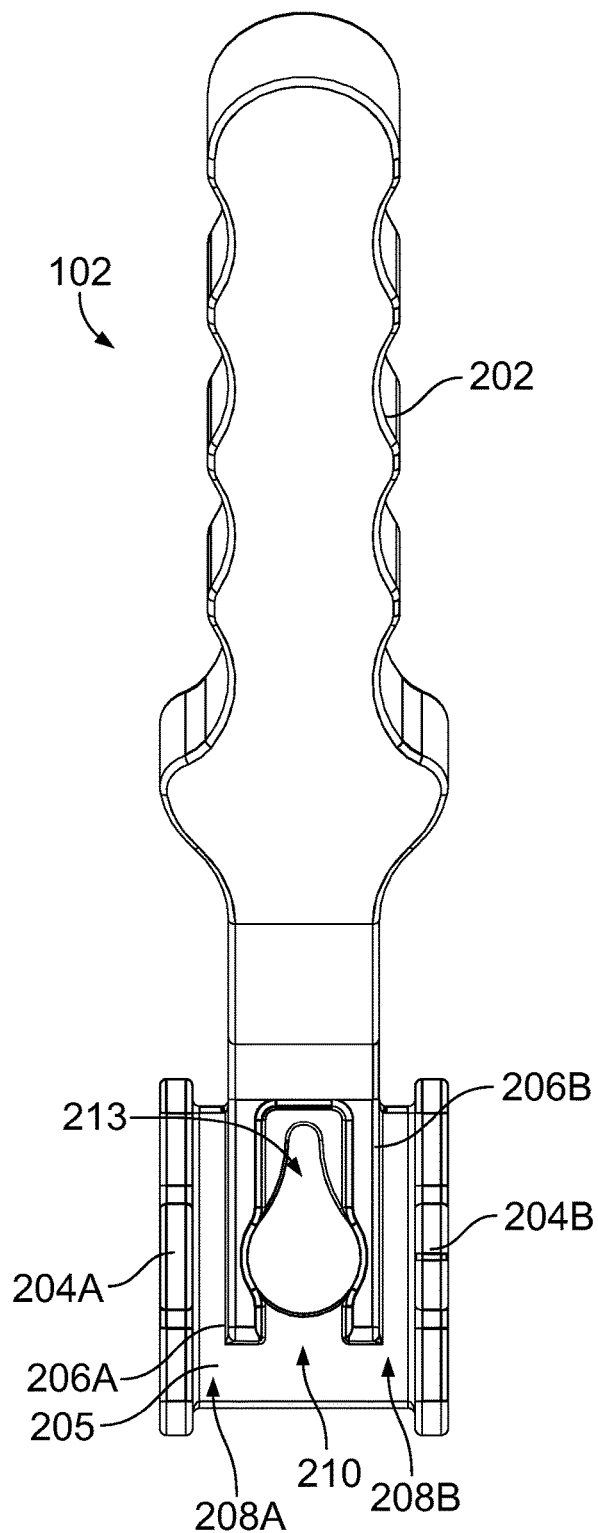
FIG. 26 is a top plan view of the body and handle of FIG. 25.
Figure 27:
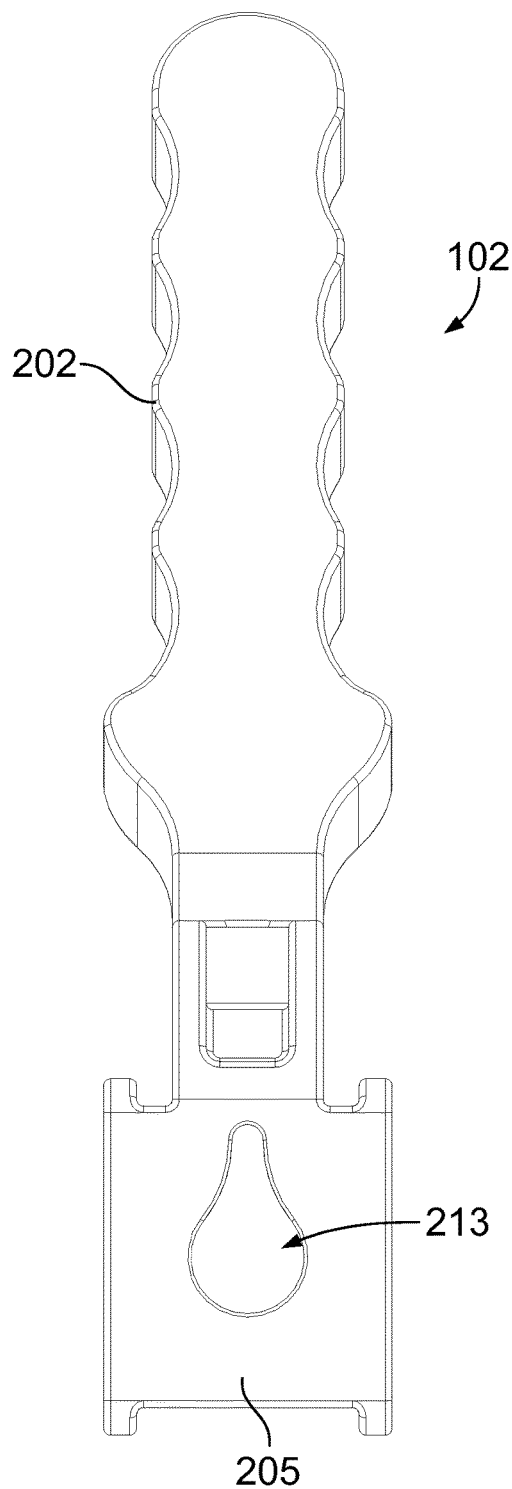
FIG. 27 is a bottom plan of the body and handle of FIG. 25.
Figure 28:
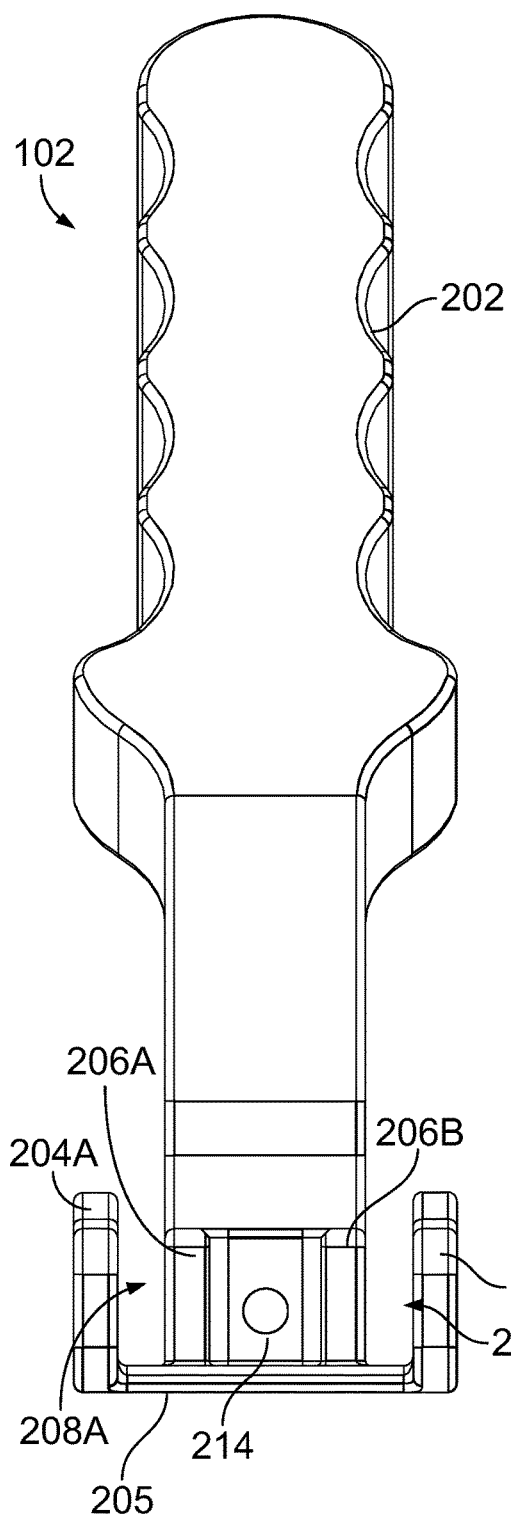
FIG. 28 is a front elevation of the body and handle of FIG. 25.
Figure 29:
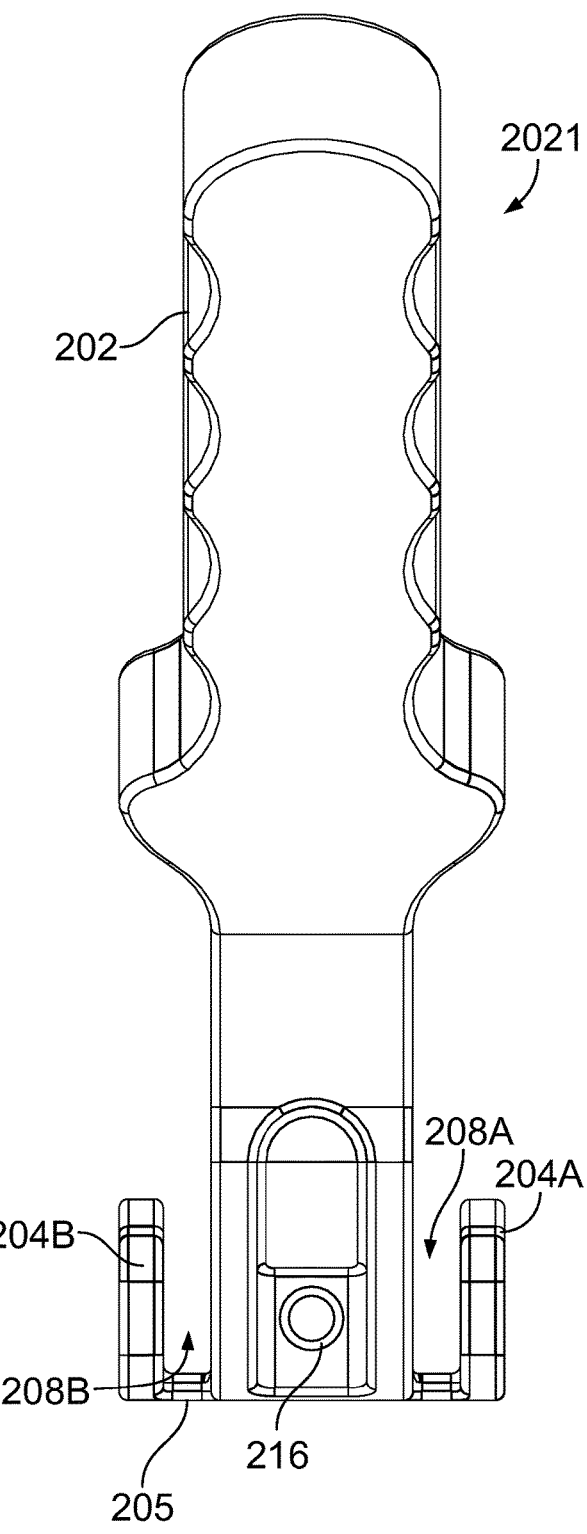
FIG. 29 is a rear elevation of the body and handle of FIG. 25.

Turning to FIGS. 26 and 27, the plate 205 includes an aperture 213 that is sized to receive the tower section 142 including the foot 138 and the anti-rotation nub 156 (see FIG. 12). In particular, the aperture 213 is configured such that, during assembly, the foot 138 passes through the plate 205 at a rear of the body portion 102 proximate to the operator gripping handle 202. Then, the sleeve 112 is rotated so that the support section 140 can rest within the region 210 after the foot 138 has passed through the plate 205 (see FIG. 1). Further, as seen in FIGS. 28 and 29, the body portion 102 includes a front aperture 214 and a rear aperture 216 through which a portion the fastener 116 (see FIG. 8) passes to securely couple the body portion 102 to the plate retainer assembly 104 via the threaded aperture 148 (see FIG. 11).

Figure 30:
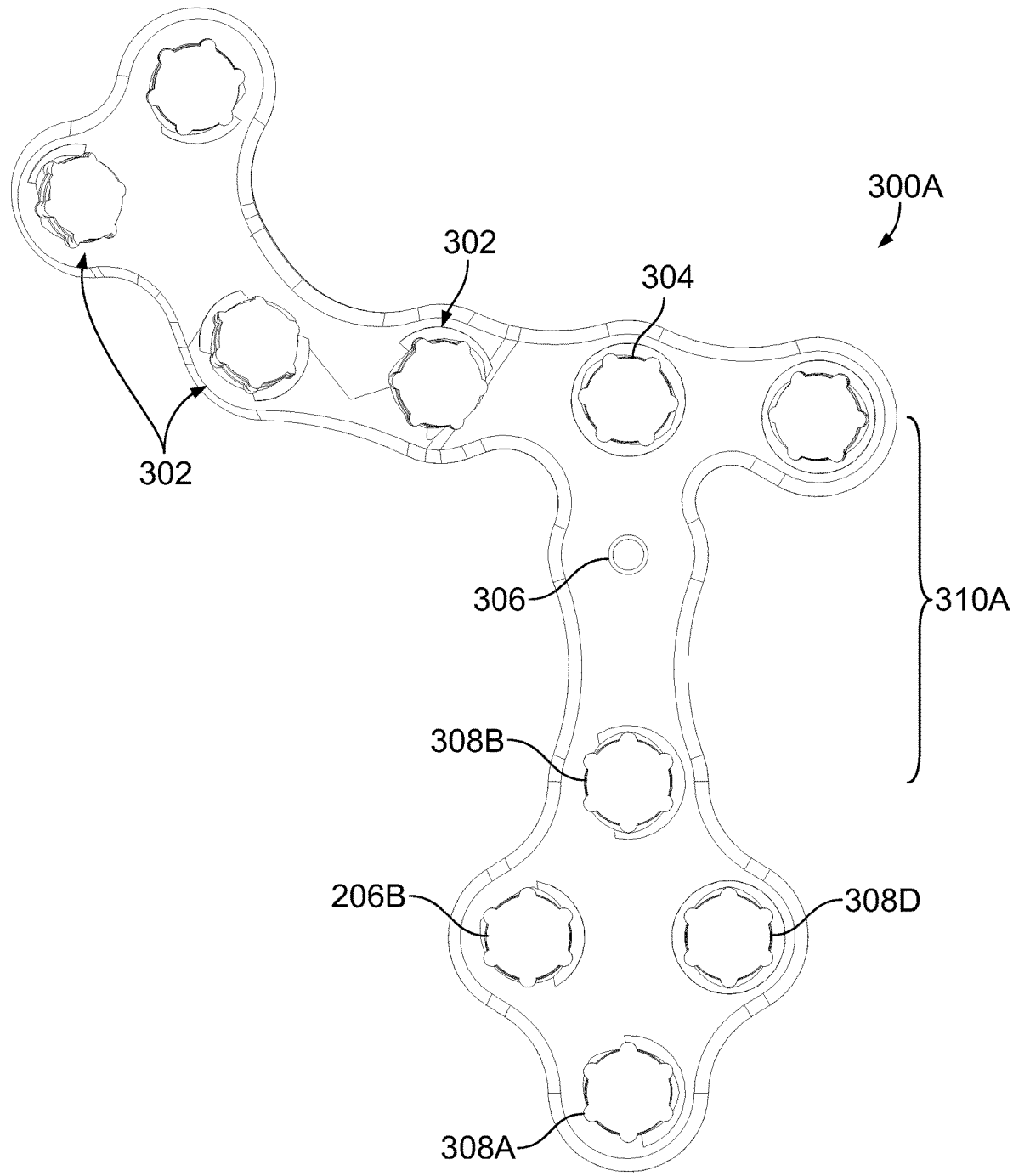
FIG. 30 is a top plan of a calcaneal plate for which the calcaneal plate inserter tool of FIG. 1 may be used.
Figure 31:
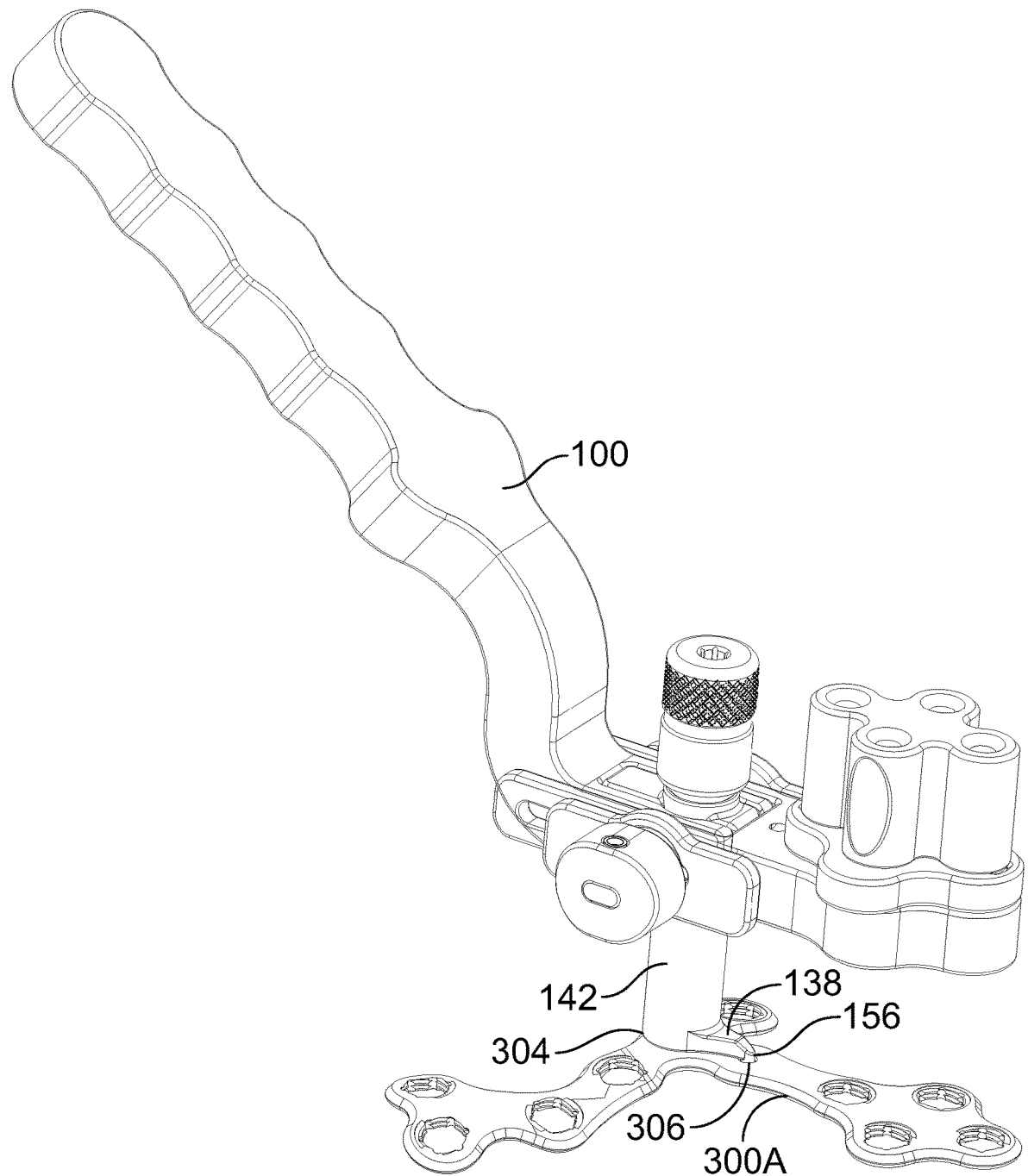
FIG. 31 is an isometric view of a tool/plate assembly that includes the calcaneal plate inserter tool of FIG. 1 coupled to the calcaneal plate of FIG. 30.

As seen in FIG. 30, a calcaneal plate 300A for use with the calcaneal plate inserter tool 100 includes rear retention holes 302 including a retaining hole 304 having a thread or inclined surface that interfaces with the thread/inclined surface on the distal end 150 of the coupling drill guide 114 when the calcaneal plate 300A is coupled to the calcaneal plate inserter tool 100 as shown in FIG. 31. The calcaneal plate 300A also includes a rotation locking aperture 306 configured to engage with the anti-rotation nub 156 when the calcaneal plate 300A is coupled to the calcaneal plate inserter tool 100 as shown in FIG. 31. Further, the calcaneal plate 300A includes forward retention holes 308A, 308B, 308C, and 308D that are displaced a distance 310A from the retaining hole 304.

As shown in FIG. 31, the calcaneal plate 300A is coupled to the calcaneal plate inserter tool 100 via the coupling drill guide 114 of the plate retainer assembly 104 such that a bottom end of the tower section 142 rests on a top surface of the calcaneal plate 300A. Further, as seen in FIG. 30, the anti-rotation nub 156 engages the rotation locking aperture 306 such that the calcaneal plate inserter tool 100 remains in a fixed rotational position with respect to the calcaneal plate 300A.

Figure 32:
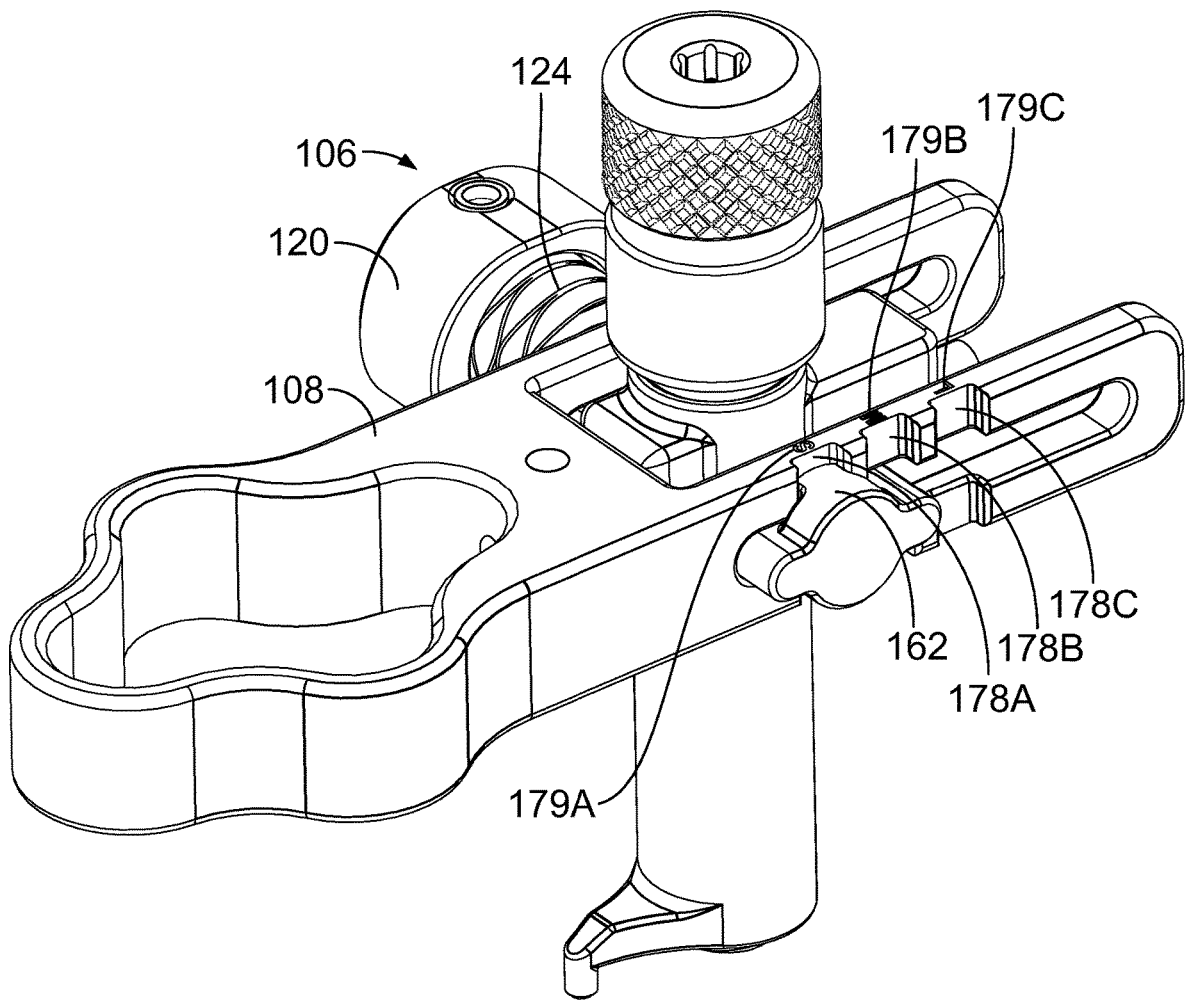
FIGS. 32-34 are isometric views showing a portion of the calcaneal plate inserter tool of FIG. 1 and showing the lock in three different indexed positions.
Figure 33:
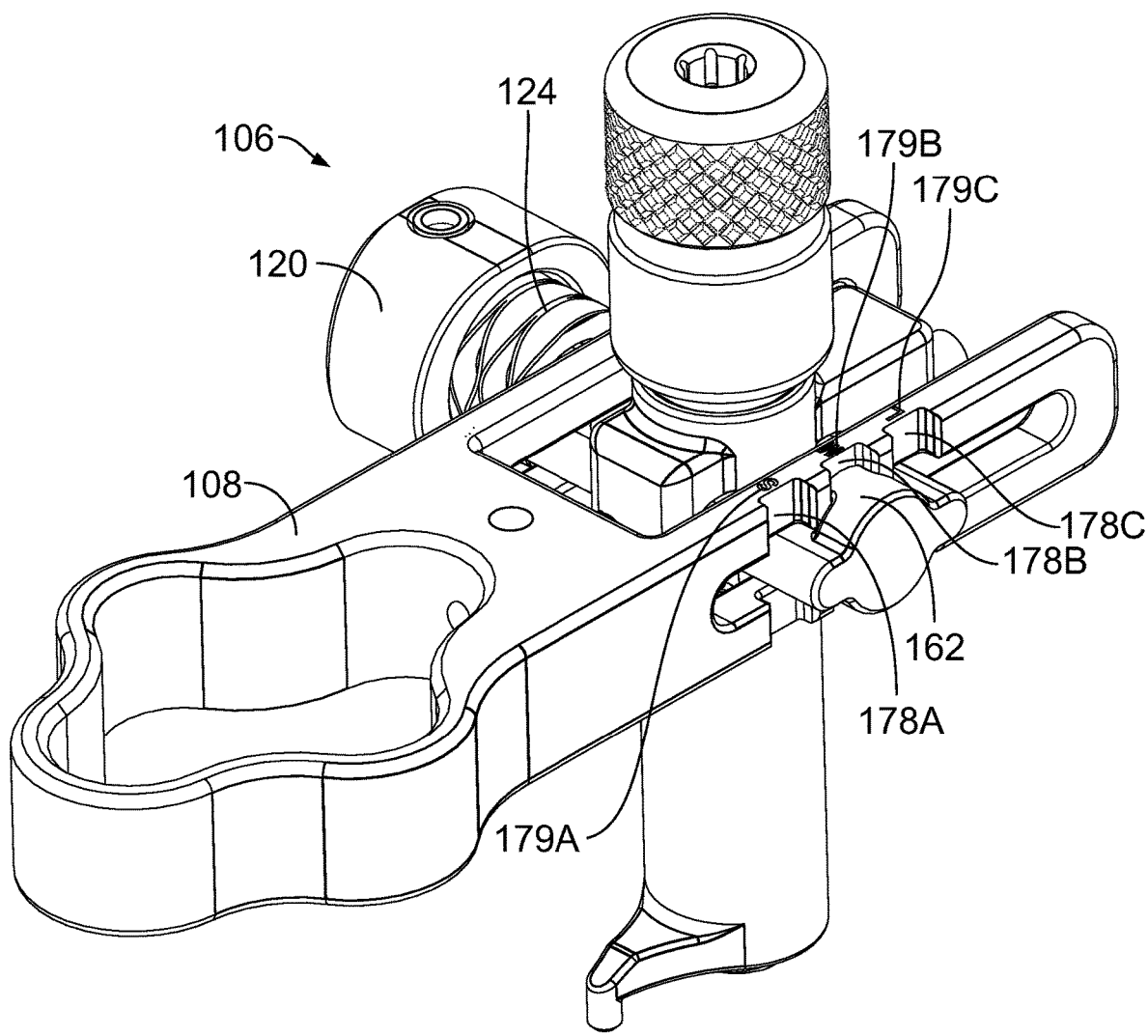
Figure 34:
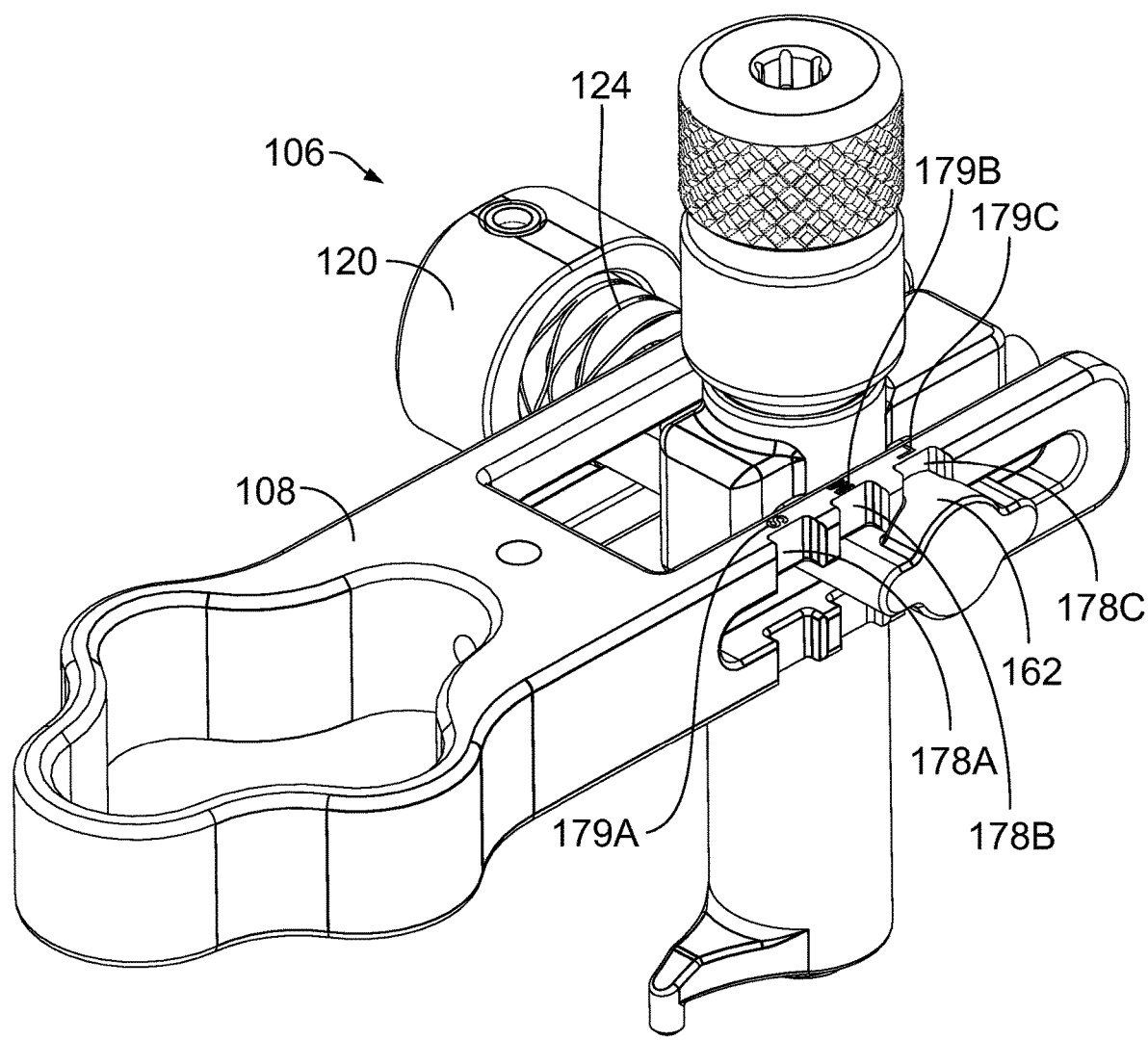

Turning to FIGS. 32-34, the sled 108 includes slots 178A, 178B, and 178C into which the stop 162 can be located to secure the sled 108 in the indexed positions relative to the body portion 102. These indexed positions correspond to different sizes of calcaneal plates to which the calcaneal plate inserter tool 100 can be coupled. As seen in FIGS. 32-34, the slot 178A corresponds to a small indexed position, the slot 178B corresponds to a medium indexed position, and the slot 178C corresponds to a large indexed position. Further, the sled 108 includes optional indicia 179A, 179B, and 179C that denote each of the slots 178A, 178B, and 178C and the corresponding index position. As seen in FIGS. 32-34, indicia 179A, 179B, and 179C comprise the letters S, M, and L for the small, medium, and large indexed positions respectively.

In operation, the sled 108 is movable into the different indexed positions when the lock 106 is in an unlocked position. The lock 106 is so operated by pressing the button 120 to compress the biasing element 124, which in turn disengages the stop 162 from any of the slots 178A, 178B, and 178C. Then, the sled 108 can be translated relative to the body portion 102 until the stop 162 is aligned with a different one of the slots 178A, 178B, and 178C. At this point, the button 120 can be released so that the biasing force of the biasing element 124 acts to return the lock 106 into the lock position where the stop 162 is engaged with the different one of the slots 178A, 178B, and 178C. This operation can be performed before or after a calcaneal plate is secured to the plate insertion tool.

Figure 35:
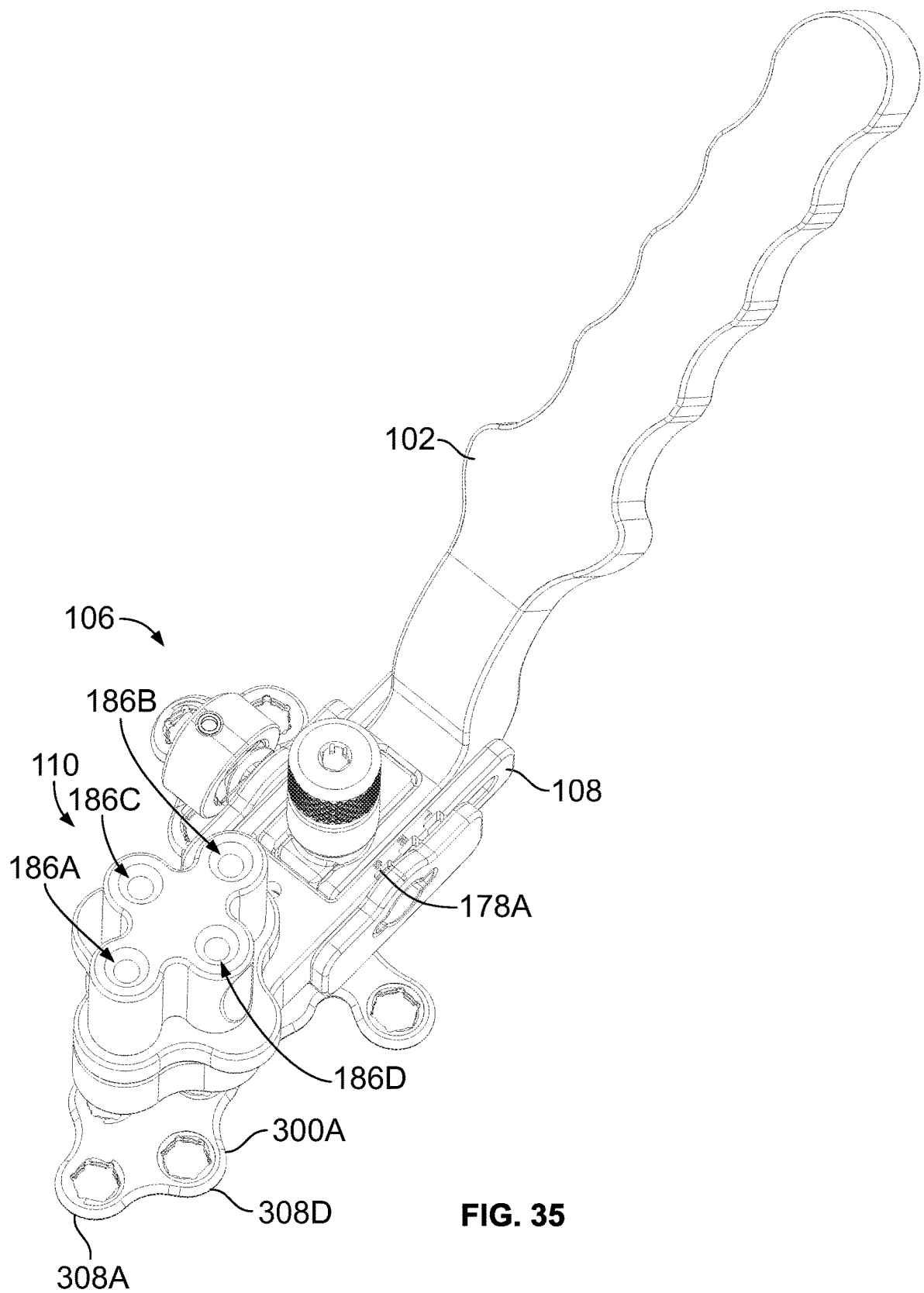
FIG. 35 is an isometric view of a tool/plate assembly that includes the calcaneal plate inserter tool of FIG. 1 coupled to the calcaneal plate of FIG. 30, taken from a different perspective from FIG. 34.
Figure 36:
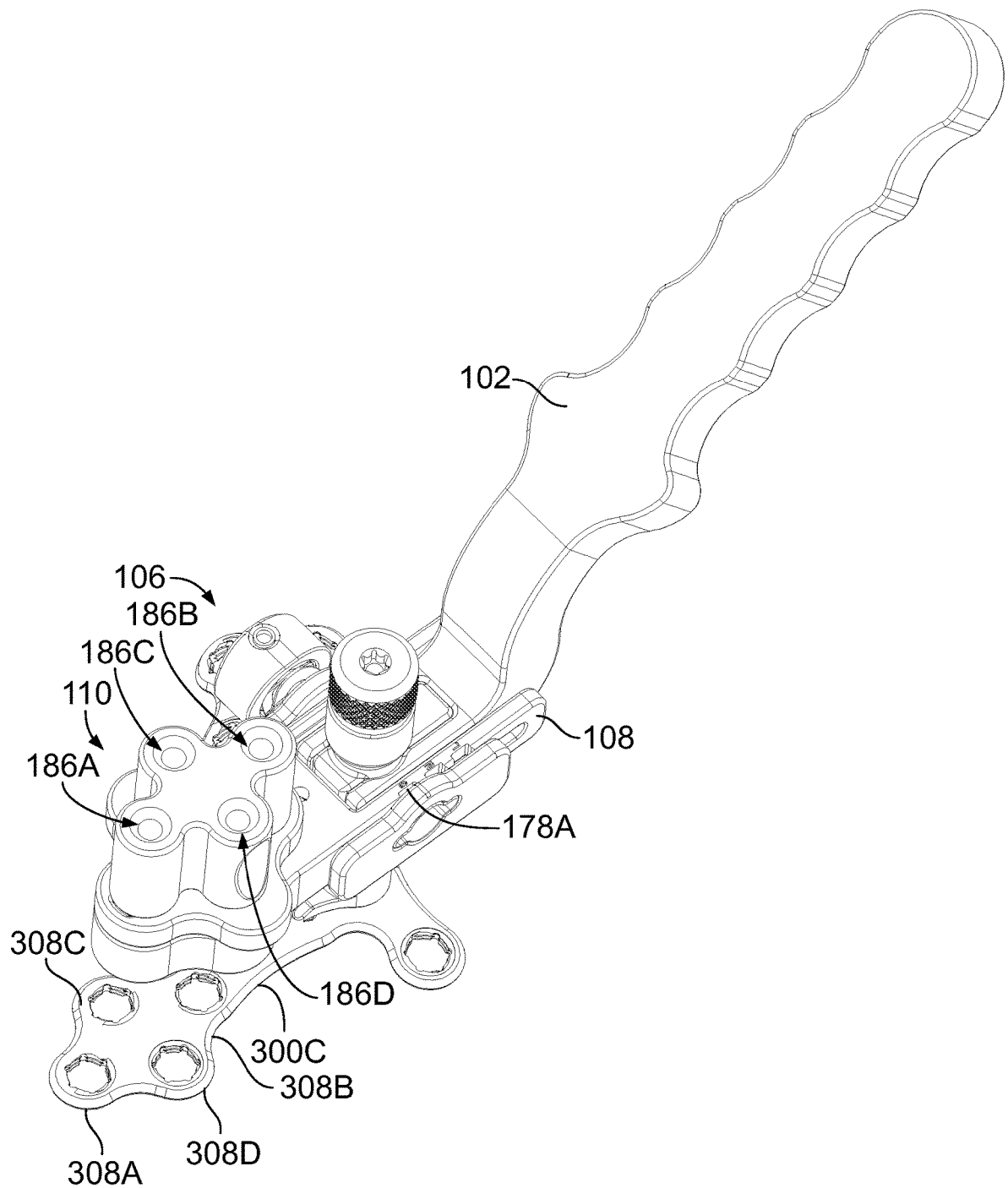
FIG. 36 is an isometric view of a tool/plate assembly that includes the calcaneal plate inserter tool of FIG. 1 coupled to a calcaneal plate but where the guide is not yet positioned correctly.
Figure 37:
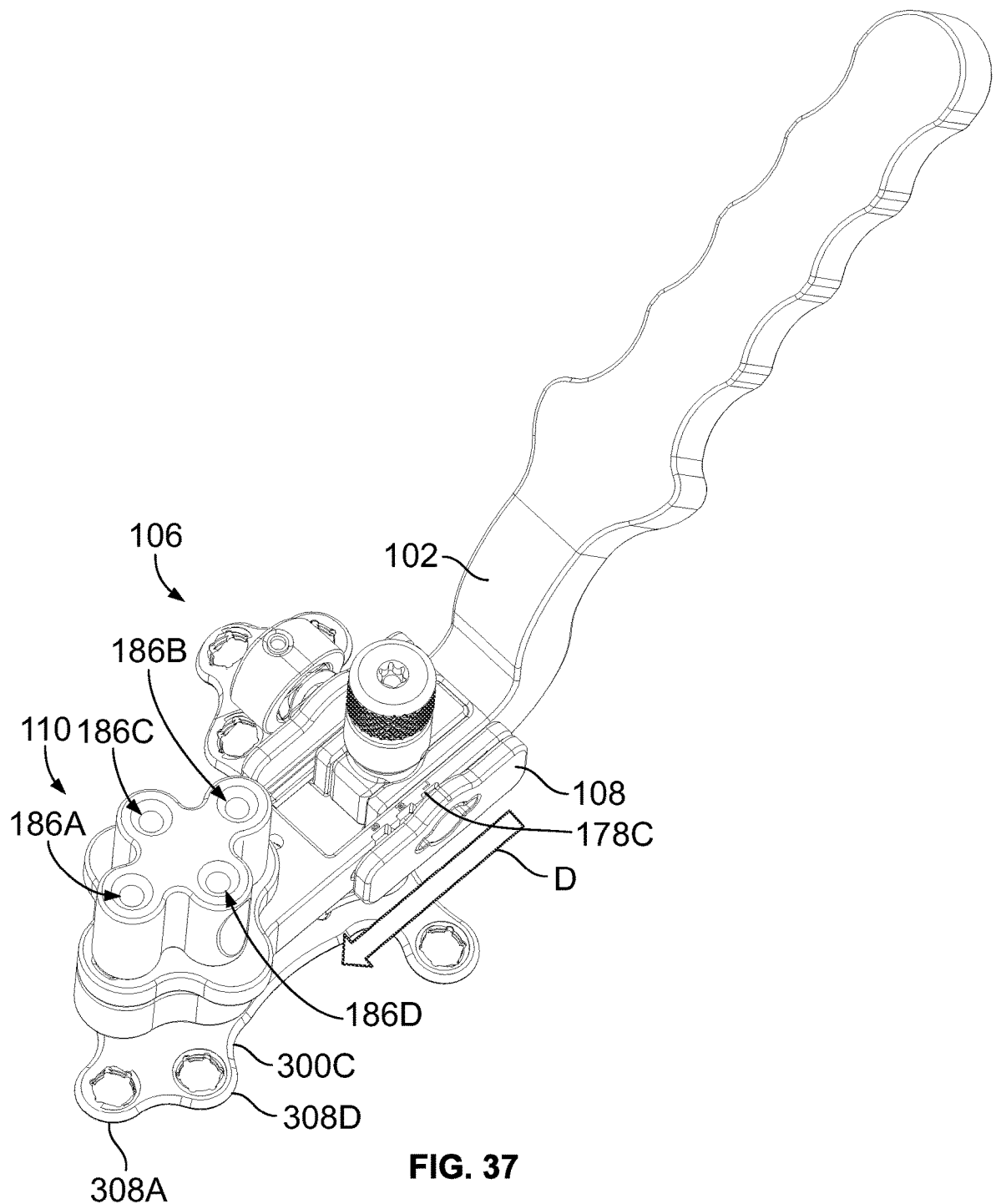
FIG. 37 is an isometric view of the tool/plate assembly of FIG. 36 where the guide is positioned correctly for the plate.
Figure 38:
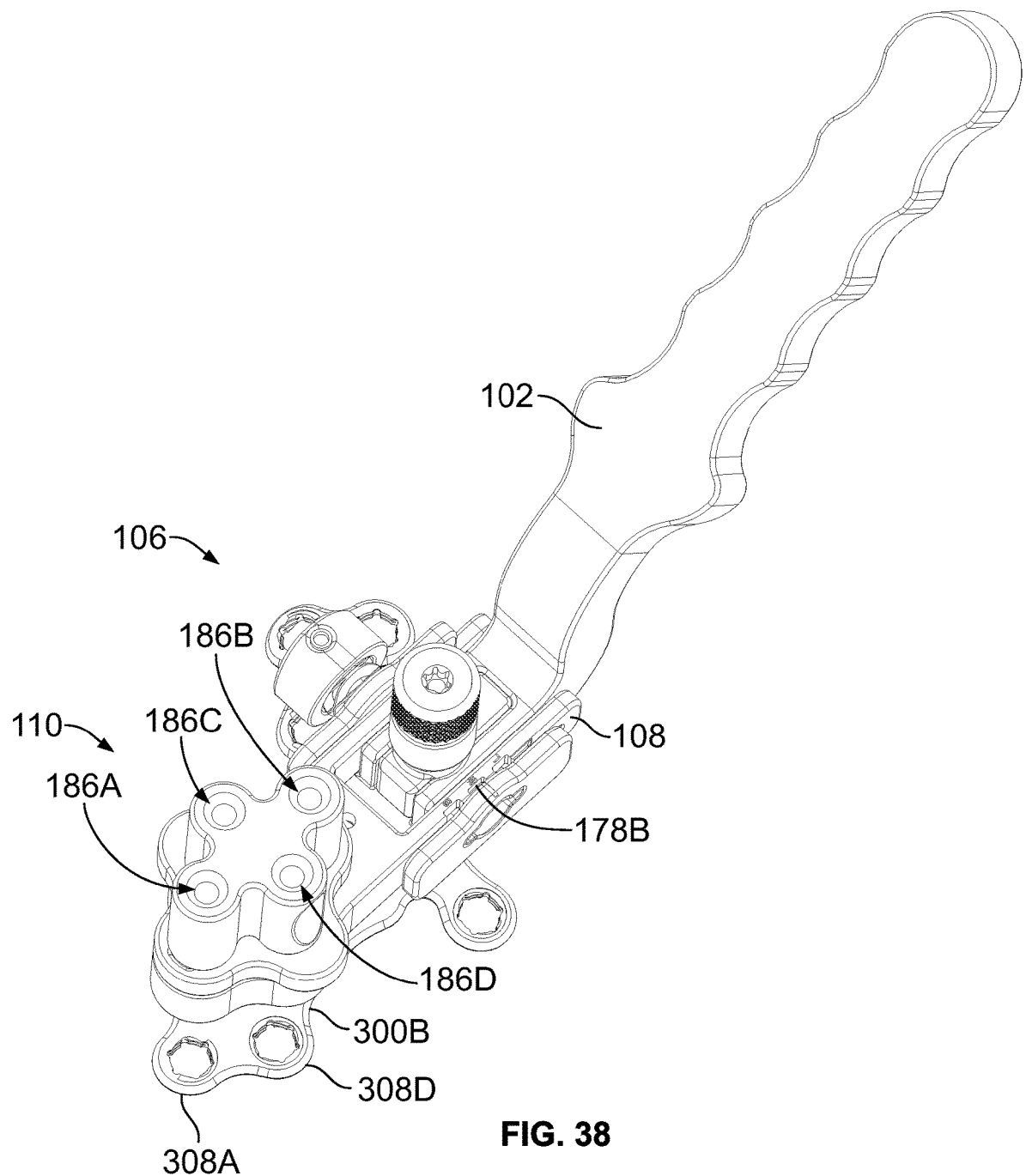
FIG. 38 is an isometric view of a tool/plate assembly that includes the calcaneal plate inserter tool of FIG. 1 coupled to another calcaneal plate.

As seen in FIG. 35, when the calcaneal plate inserter tool 100 is coupled to the calcaneal plate 300A (e.g., a small plate) and the sled 108 is secured in the small index position corresponding to the slot 178A, the drill bit guide channels 186A, 186B, 186C, and 186D are aligned with forward retention holes 308A, 308B, 308C, and 308D respectively. As seen in FIG. 36, though, when the calcaneal plate 300A is replaced with a large calcaneal plate 300C and the sled 108 remains secured in the small index position, the drill bit guide channels 186A, 186B, 186C, and 186D are no longer aligned with the forward retention holes 308A, 308B, 308C, and 308D of the calcaneal plate 300C. The lock 106 can then be disengages as described above to enable the operator to move the sled 108 in the direction of the arrow D from the small index position corresponding to the slot 178A into the large index position corresponding to the slot 178C. As seen in FIG. 37, the drill bit guide channels 186A, 186B, 186C, and 186D are again aligned with the forward retention holes 308A, 308B, 308C, and 308D of the calcaneal plate 300C once the sled 108 is moved into the large index position. Further, as seen in FIG. 38, the drill bit guide channels 186A, 186B, 186C, and 186D are also aligned with the forward retention holes 308A, 308B, 308C, and 308D of a calcaneal plate 300B (e.g., a medium plate) when the sled 108 is positioned in the medium index position corresponding to the slot 178B.

The structure is shown as an indexed locking mechanism but the calcaneal plate inserter tool 100 may be fashioned without indexes. For example, the lock can include a screw element (not shown) used to secure the sled 108 in one freely selected position. In such embodiments, the drill bit guide channels 186A, 186B, 186C, and 186D can be aligned with the forward retention holes 308A, 308B, 308C, and 308D of whatever sized plate is attached to the calcaneal plate inserter tool 100 and, once so aligned, the screw element can be tightened to secure the sled 108 in the aligned position. However, it will also be appreciated that additional variations of the lock 106 for use with a freely selectable position that do not employ the screw element are also contemplated.

Figure 39:
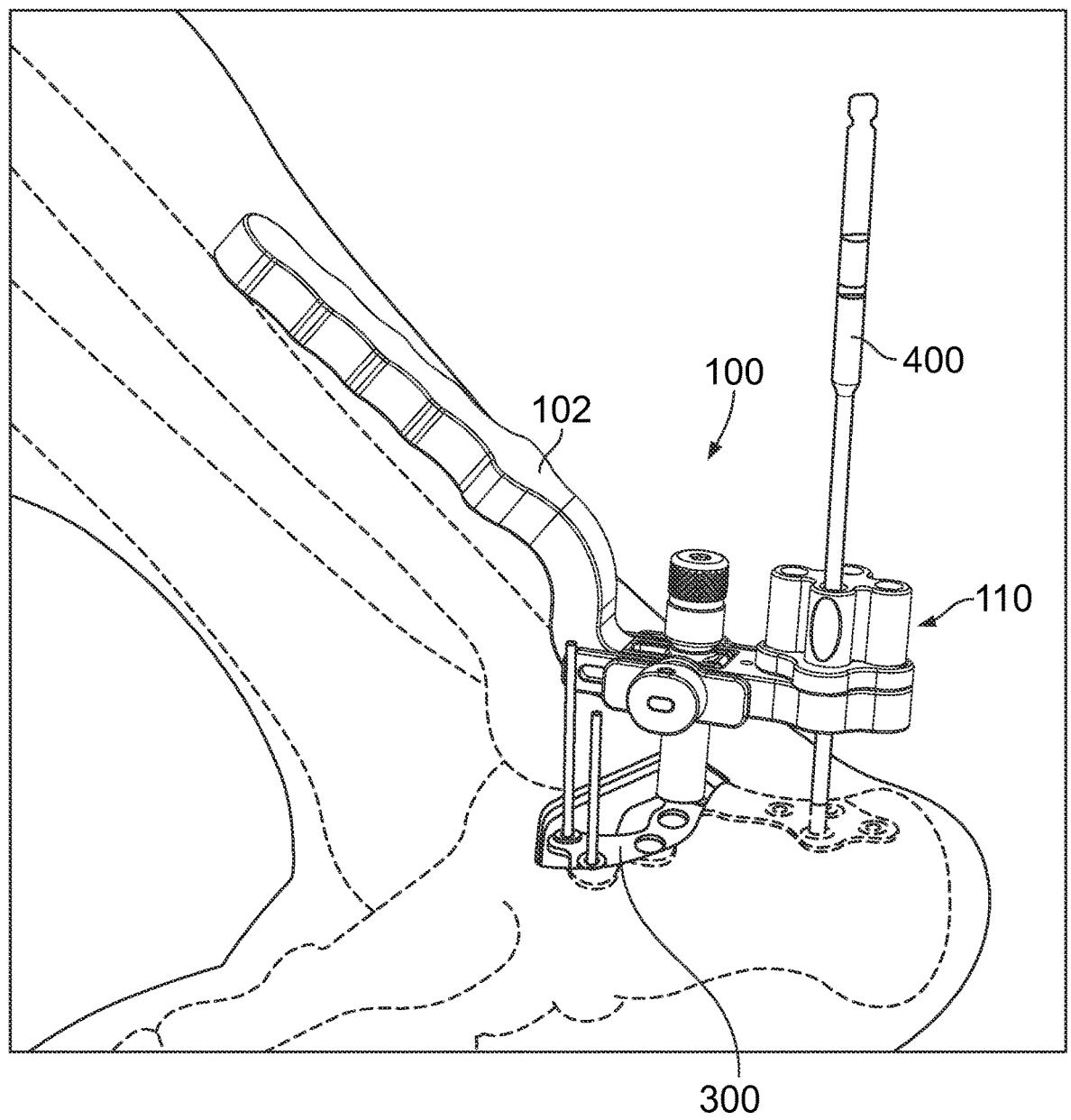
FIG. 39 is a perspective view showing a step in the process of placing a calcaneal plate into position on the calcaneus of a patient using the tool/plate assembly.

With reference to FIG. 39, after selecting a calcaneal plate from among plural plates of different sizes, for example the calcaneal plate 300A, the plate is attached to the calcaneal plate inserter tool 100 and the lock 106 is transitioned into the unlocked position. The sled is them moved into the indexed position that corresponds to the size of the calcaneal plate 300A and then transitioned into the lock position. The calcaneal plate 300A may be attached to the calcaneal plate inserter tool 100 before or after adjustment of the sled 108 into the correct indexed position.

Figure 40:
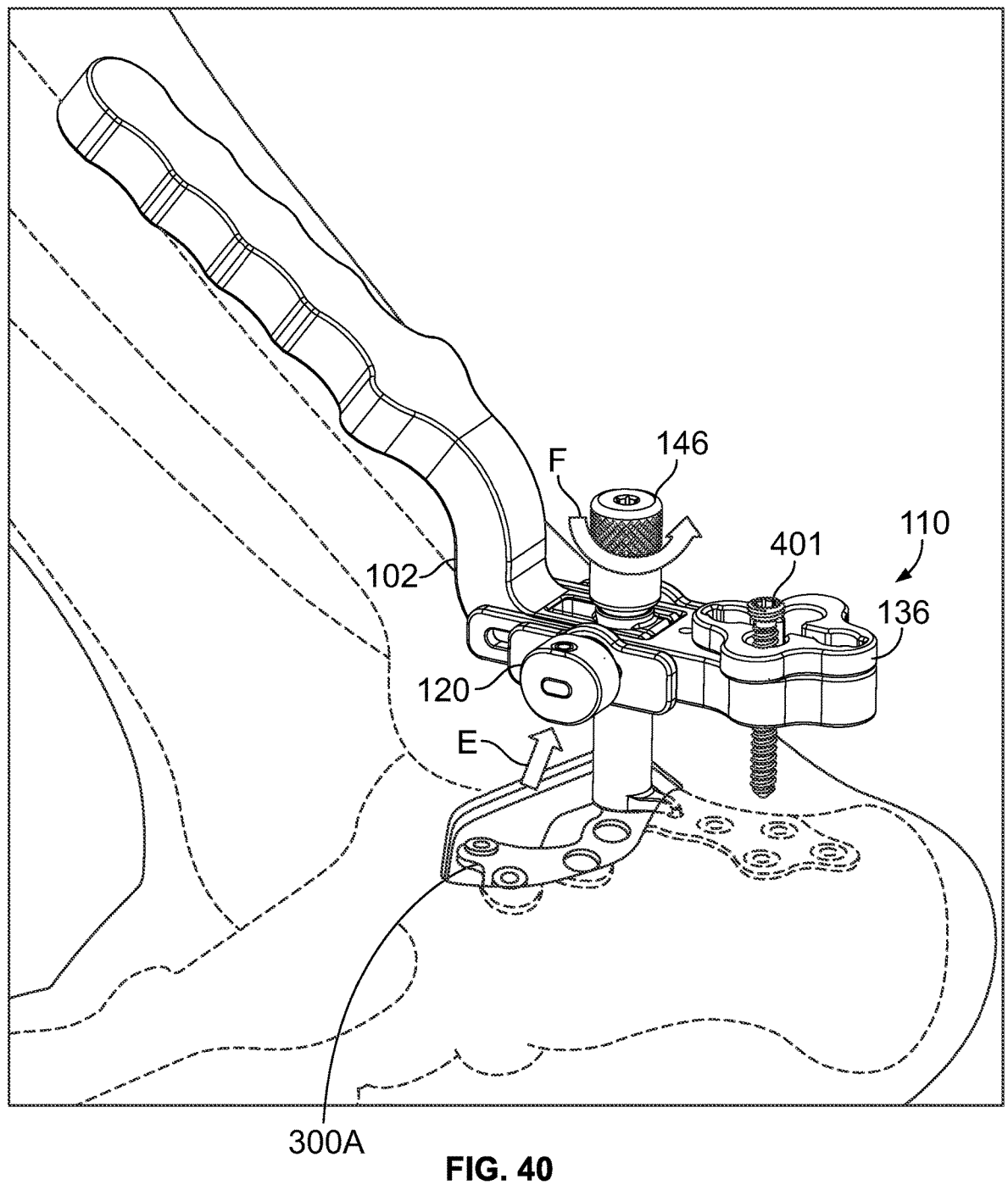
FIG. 40 is an isometric view showing a subsequent step in the process of placing a calcaneal plate into position on the calcaneus of a patient using the tool/plate assembly.

In a surgical procedure, the surgeon makes an incision in patient near the calcaneal bone. Then, the surgeon uses the operator gripping handle 202 of the body portion 102 on the assembled calcaneal plate inserter tool 100 and calcaneal plate 300A to place the calcaneal plate 300A through the incision and under an exterior skin layer of the patient as seen in FIG. 39. Next, a drill bit such as a drill bit 400 is inserted through the gang guide 110 to position the drill bit 400 at a location aligned with at least one of the forward retention holes 308A, 308B, 308C, and 308D of the calcaneal plate 300A. Subsequently, the surgeon drills a pilot hole at that location. In particular, the drill bit 400 is inserted through one of drill bit guide channels 186A, 186B, 186C, and 186D in the drill guide 134 (see FIG. 24). The surgical method can include repeating this process until a pilot hole is drilled at locations corresponding to each of the forward retention holes 308A, 308B, 308C, and 308D. Then, as seen in FIG. 40 after all the pilot holes are drilled, the method can include removing the drill guide 134 to expose the screw guide 136. Using the screw guide 136 if desired, the surgeon then can insert a screw 401 into each of the pilot holes at the locations corresponding to each of the forward retention holes 308A, 308B, 308C, and 308D. If desired, the surgeon can also drill a pilot hole though the retaining hole 304 by inserting the drill bit 400 through the hollow interior channel 154 of the coupling drill guide 114 (step not shown). The coupling drill guide 114 can be removed and affixed to other holes in the plate for use as a guide, if desired.

After the screw 401 has been inserted, the surgeon decouples the calcaneal plate inserter tool 100 from the calcaneal plate 300A. The button 120 can be depressed in the direction of the arrow E to transition the lock 106 into the unlocked position so as to disengage the main body 160 from the axial groove 158 by aligning the larger region 171 of the eccentric aperture 167 with the interior cannula 152 of the sleeve 112 (see FIGS. 16-17C). Then the proximal grip 146 of the coupling drill guide 114 can be turned in the direction indicated by the arrow F to decouple the distal end 150 from the retaining hole 304 in the calcaneal plate 300A. After the calcaneal plate 300A is decoupled from the calcaneal plate inserter tool 100, the surgeon can attach the coupling drill guide 114 to each of the rear retention holes 302 of the calcaneal plate 300A and use the hollow interior channel 154 to drill additional pilot holes at the rear retention holes 302 of the calcaneal plate 300A.

Figure 41:
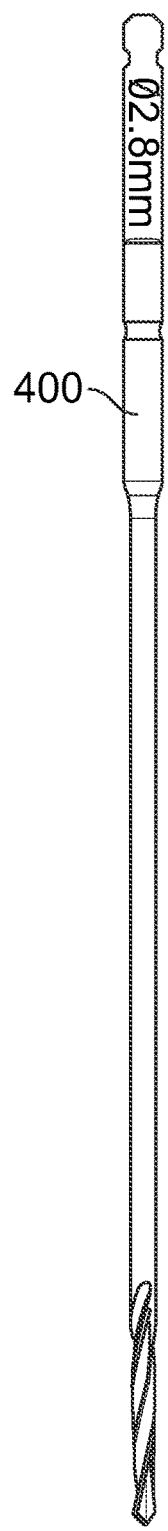
FIG. 41 is a front elevation of a drill bit useful in a kit with the tool of FIG. 1.
Figure 42:
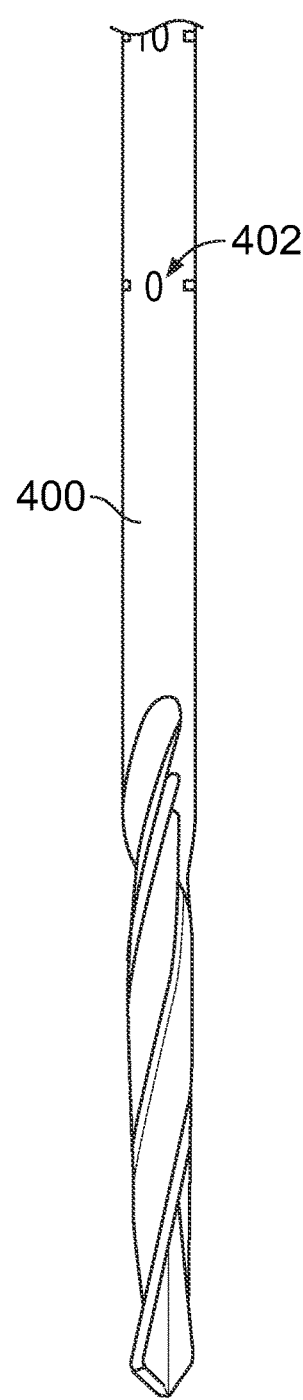
FIG. 42 is a relatively enlarged elevation of a first portion of the drill bit of FIG. 41.
Figure 43:
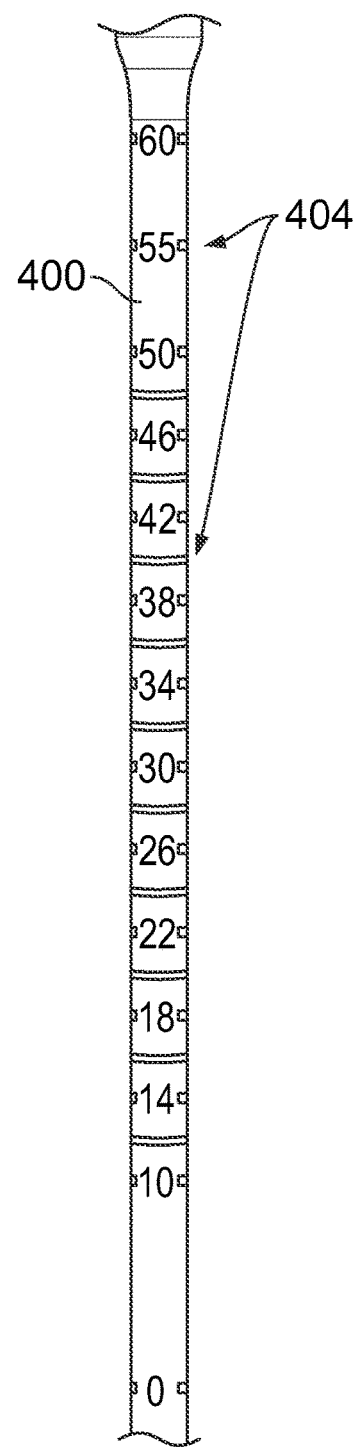
FIG. 43 is a relatively enlarged elevation of a second portion of the drill bit of FIG. 41.

Referring to FIGS. 41-43, the drill bit 400 can include a zero marking 402 and additional depth markings 404 for assisting the operator when drilling the pilot holes into the patient. Because the exact depth of screw needed to secure the calcaneal plate 300A in the patient is a function of the patient's anatomy, the operator of the calcaneal plate inserter tool 100 can utilize the zero marking 402 and additional depth markings 404 to identify the length of the screw 401 needed. In some embodiments, the zero marking 402 and additional depth markings 404 are laser etched onto the drill bit 400.

Figure 44:
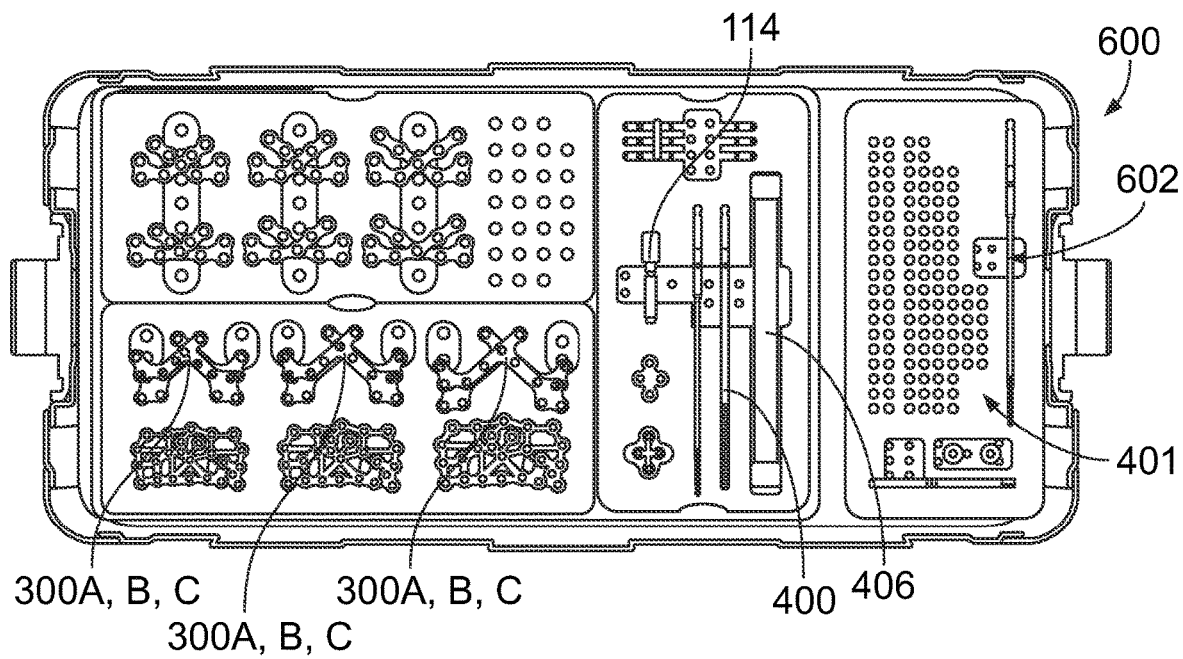
FIG. 44 is a top plan view of an upper layer of a two-layer kit useful with the calcaneal plate inserter tool.
Figure 45:
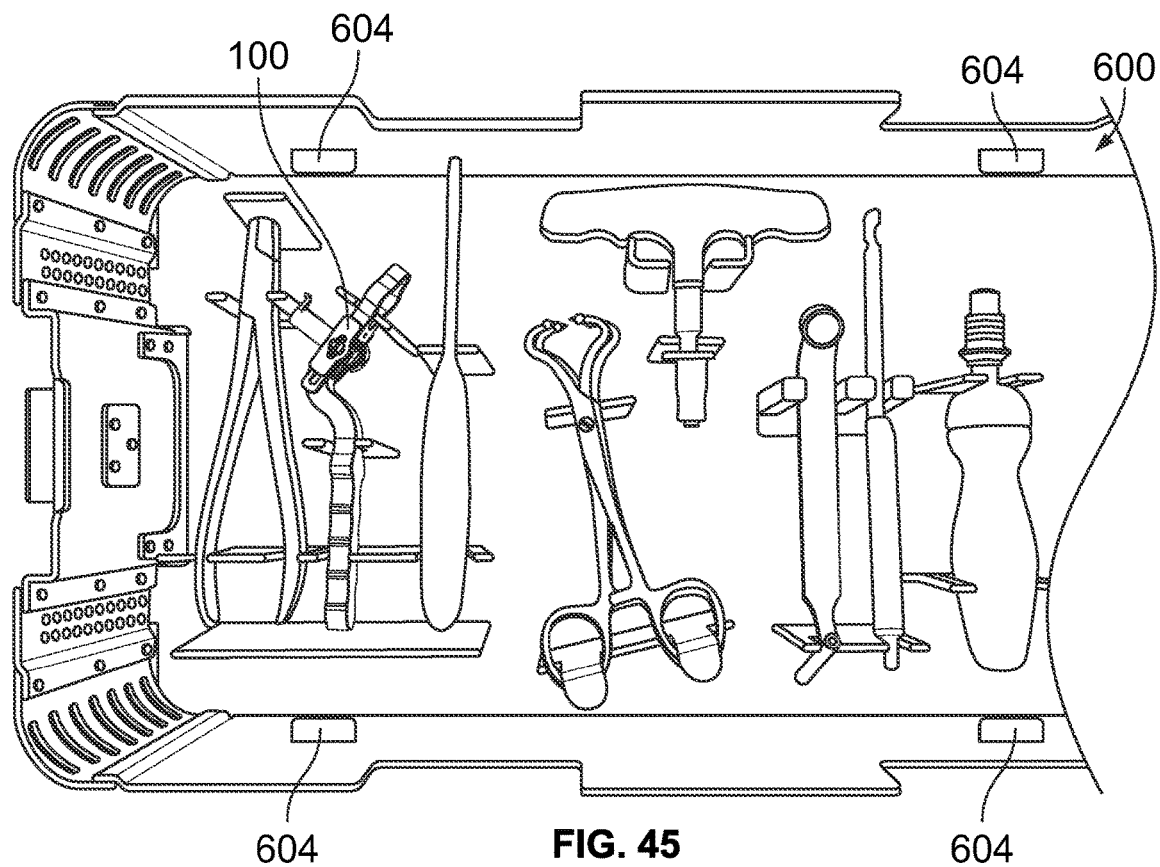

Embodiments described herein are also directed to a medical procedure kit 600 that, as seen in FIGS. 44 and 45, is a dual-layer kit that includes the calcaneal plates 300A, 300B, and 300C, and other plates contained in a top section of the medical procedure kit 600. Also contained in the top section are the coupling drill guide 114, the drill bit 400, and the screws 401, alongside other equipment for the calcaneal plate insertion procedure. As seen in FIG. 44, the calcaneal plates 300A, 300B, and 300C, the coupling drill guide 114, the drill bit 400, and the screws 401 can reside in a removable tray 602 that rests on ledges 604 of a lower section of the medical procedure kit 600. As seen in FIG. 45, the lower section can contain the calcaneal plate inserter tool 100 (expect for the coupling drill guide 114) alongside other instruments for the calcaneal plate insertion procedure. These additional instruments can include at least guide wires 406 that are used to hold broken bone fragments together as needed.

The calcaneal plates should be made of a bone-compatible material such as titanium or a titanium alloy. The plate insertion tool can be made of any suitable material, such as aluminum or steel. The components of the kit can be conventional or otherwise formed as suitable.

It will also be appreciated that during a surgical procedure only some of the components of the kit 600 will be consumed. These consumed parts are replaced in the medical procedure kit 600 and the kit 600 is sterilized for subsequent use. The medical procedure kit 600 can be sterilized by wrapping the kit 600 with a CSR wrap or similar and subjecting the medical procedure kit 600 to steam sterilizing.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A calcaneal plate inserter tool comprising:
   a body portion;
   a plate retainer assembly coupled to the body portion;
   a sled coupled to the body portion and movable relative to the body portion between a plurality of different positions relative to the body portion;
   a lock coupled to the body portion and operable between a lock position and an unlocked position, the lock, when in the lock position, impeding movement of the sled relative to the body portion;
   the sled including a guide portion.

2. The calcaneal plate inserter tool of claim 1 wherein the plate retainer assembly extends through an aperture in the body portion.

3. The calcaneal plate inserter tool of claim 1 wherein the lock comprises:
   a slider passing through an opening in the body portion and engaging the sled when the lock is in the locked position;
   a button coupled to the slider; and
   a biasing element biasing the lock into the lock position and cooperating with the button to disengage the lock from the lock position upon depression of the button.

4. The calcaneal plate inserter tool of claim 3 wherein the slider includes a first element configured to engage with any one of a plurality of second elements formed in the sled when the lock is in the lock position to thereby provide indexed positioning of the sled relative to the body portion.

5. The calcaneal plate inserter tool of claim 1 wherein the plate retainer assembly comprises:
   a sleeve coupled to the body portion; and
   a removable coupling drill guide having a threaded distal end, the coupling drill guide passing through the sleeve.

6. The calcaneal plate inserter tool of claim 5 wherein the sleeve includes a gap sized to allow a portion of the lock to pass therethrough.

7. The calcaneal plate inserter tool of claim 5 wherein the sleeve comprises a foot with a protruding anti-rotation nub.

8. The calcaneal plate inserter tool of claim 1, wherein the guide portion of the sled includes a removable gang guide, the removable gang guide including one or more drill bit guide channels.

9. The calcaneal plate inserter tool of claim 8, comprising a removable gang guide assembly that comprises the gang guide removably nested within a removable screw guide.

10. The calcaneal plate inserter tool of claim 1, wherein the body portion comprises an operator gripping handle.

11. A plate inserter assembly comprising:
    the calcaneal plate inserter tool of claim 1; and
    a calcaneal plate coupled to the plate retainer assembly.

12. The plate inserter assembly of claim 11 wherein the plate retainer assembly includes a protruding anti-rotation nub engaged with a respective rotation locking aperture in the calcaneal plate.

13. A method for inserting a calcaneal plate, the method comprising performing the following steps in any order appropriate:
    selecting a calcaneal plate from among plural plates of different sizes;
    attaching the calcaneal plate to the calcaneal plate inserter tool of claim 1;
    transitioning the lock into the unlocked position;
    while the lock is in the unlocked position, moving the sled into an indexed position that corresponds to a size of the calcaneal plate;
    transitioning the lock into the lock position to secure the sled in the indexed position.

14. The method of claim 13, wherein the indexed position corresponds to the size of the calcaneal plate such that when the sled is located in the indexed position a guide portion of the sled is positioned in alignment with at least one retaining hole in the calcaneal plate.

15. The method of claim 13, further comprising using a handle of the calcaneal plate inserter tool to position the calcaneal plate under an exterior skin layer of a patient.

16. The method of claim 13 further comprising:
    when the sled is in the indexed position, feeding a drill bit through a drill guide to position the drill bit at a location aligned with at least one retaining hole of the calcaneal plate, the drill guide coupled to a guide portion of the sled; and
    drilling a pilot hole at the location.

17. The method of claim 16 further comprising:
    removing the drill guide to expose a screw guide; and
    using the screw guide to insert a screw into the pilot hole through the at least one retaining hole.

18. The method of claim 16, comprising moving the sled into an indexed position that corresponds to a size of the calcaneal plate after attachment of the plate to the plate inserter tool.

19. The medical procedure kit of claim 18 wherein the plate retainer assembly includes a protruding anti-rotation nub configured to engage a rotation locking aperture in different sized calcaneal plates.

20. A medical procedure kit comprising:
a plurality of different sized calcaneal plates;
the calcaneal plate inserter tool of claim 1;
wherein the lock is configured to retain the sled in indexed positions relative to the body portion when the lock is in the lock position; and
a gang guide removably coupled in the guide portion of the sled, the gang guide including one or more drill bit guide channels that are configured to align with retaining holes of the plurality of different sized calcaneal plates when the sled is secured in a corresponding one of the indexed positions.

21. The medical procedure kit of claim 20 wherein each of the different sized calcaneal plates includes a screw hole configured to receive a screw of the plate retainer assembly.

22. The medical procedure kit of claim 21 wherein the indexed positions correspond to the respective size of each of the different sized calcaneal plates.

23. A calcaneal plate inserter tool comprising:
a body portion;
a plate retainer assembly coupled to the body portion;
a sled coupled to the body portion and movable relative to the body portion;
a lock coupled to the body portion and operable between a lock position and an unlocked position, the lock, when in the lock position, impeding movement of the sled relative to the body portion;
the sled including a guide portion;
wherein the lock comprises:
a slider passing through an opening in the body portion and engaging the sled when the lock is in the locked position;
a button coupled to the slider; and
a biasing element biasing the lock into the lock position and cooperating with the button to disengage the lock from the lock position upon depression of the button;
wherein the slider includes a region sized to engage and retain a portion of the plate retainer assembly when the lock is in the lock position and having a region sized for clearance of the portion of the plate retainer assembly when the lock is in the unlocked position.

24. The calcaneal plate inserter tool of claim 23 wherein the slider includes an eccentric aperture that includes a smaller region interceded by a larger region, the smaller region being sized to engage a portion of the plate retainer assembly when the lock is in the locked position to impede axial movement of the portion relative to the slider, the larger region being sized to allow relative axial movement of the portion and the slider.

25. A calcaneal plate inserter tool comprising:
a body portion;
a plate retainer assembly coupled to the body portion;
a sled coupled to the body portion and movable relative to the body portion;
a lock coupled to the body portion and operable between a lock position and an unlocked position, the lock, when in the lock position, impeding movement of the sled relative to the body portion;
the sled including a guide portion;
wherein the plate retainer assembly comprises:
a sleeve coupled to the body portion; and
a removable coupling drill guide having a threaded distal end, the coupling drill guide passing through the sleeve;
wherein the coupling drill guide comprises an axial groove engaging a region of a slider of the lock when the lock is in the lock position.

26. The calcaneal plate inserter tool of claim 25 wherein the sleeve comprises a support section coupled to the body and a superseding tower section.

* * * * *